United States Patent
Swahar

(10) Patent No.: US 9,455,891 B2
(45) Date of Patent: Sep. 27, 2016

(54) METHODS, APPARATUS, AND ARTICLES OF MANUFACTURE TO DETERMINE A NETWORK EFFICACY

(71) Applicant: The Nielsen Company (US), LLC, Schaumburg, IL (US)

(72) Inventor: Gayathri Swahar, Bangalore (IN)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 14/471,701

(22) Filed: Aug. 28, 2014

(65) Prior Publication Data

US 2015/0113129 A1 Apr. 23, 2015

Related U.S. Application Data

(63) Continuation of application No. 12/835,563, filed on Jul. 13, 2010, now Pat. No. 8,874,727.

(30) Foreign Application Priority Data

May 31, 2010 (IN) ............................ 1486/CHE/2010

(51) Int. Cl.
*G06F 15/173* (2006.01)
*H04L 12/26* (2006.01)
*G06F 17/30* (2006.01)
*G06Q 10/10* (2012.01)

(52) U.S. Cl.
CPC ........... *H04L 43/08* (2013.01); *G06F 17/3053* (2013.01); *G06F 17/30699* (2013.01); *G06F 17/30867* (2013.01); *G06Q 10/10* (2013.01)

(58) Field of Classification Search
CPC ............................ H04L 67/306; H04L 51/32
USPC ........................................................... 709/224
See application file for complete search history.

(56) References Cited

U.S. PATENT DOCUMENTS

| 3,950,618 A | 4/1976 | Bloisi |
| 5,041,972 A | 8/1991 | Frost |
| 5,077,785 A | 12/1991 | Monson |

(Continued)

FOREIGN PATENT DOCUMENTS

| CA | 2677097 | 8/2008 |
| EP | 1052582 | 11/2000 |

(Continued)

OTHER PUBLICATIONS

IP Australia, Examination Report, issued in connection with corresponding Australian Patent Application No. 2013203795, on Feb. 5, 2014 (5 pages).

(Continued)

*Primary Examiner* — Wing F Chan
*Assistant Examiner* — Andrew Woo
(74) *Attorney, Agent, or Firm* — Hanley, Flight & Zimmerman, LLC

(57) ABSTRACT

Methods, apparatus, and articles of manufacture to determine a network efficacy are described. An example method to determine a network efficacy includes determining a connectedness for a user of a social networking site, determining an interactivity for the user, determining a network constancy for the user, and determining the network efficacy of the social networking site based on the connectedness, the interactivity, and the network constancy.

15 Claims, 15 Drawing Sheets

(56) References Cited

U.S. PATENT DOCUMENTS

| | | |
|---|---|---|
| 5,124,911 A | 6/1992 | Sack |
| 5,301,109 A | 4/1994 | Landauer et al. |
| 5,317,507 A | 5/1994 | Gallant |
| 5,321,833 A | 6/1994 | Chang et al. |
| 5,371,673 A | 12/1994 | Fan |
| 5,495,412 A | 2/1996 | Thiessen |
| 5,519,608 A | 5/1996 | Kupiec |
| 5,537,618 A | 7/1996 | Boulton et al. |
| 5,659,732 A | 8/1997 | Kirsch |
| 5,659,742 A | 8/1997 | Beattie et al. |
| 5,668,953 A | 9/1997 | Sloo |
| 5,671,333 A | 9/1997 | Catlett et al. |
| 5,675,710 A | 10/1997 | Lewis |
| 5,696,962 A | 12/1997 | Kupiec |
| 5,761,383 A | 6/1998 | Engel |
| 5,794,412 A | 8/1998 | Ronconi |
| 5,819,285 A | 10/1998 | Damico et al. |
| 5,822,744 A | 10/1998 | Kesel |
| 5,836,771 A | 11/1998 | Ho et al. |
| 5,845,278 A | 12/1998 | Kirsch et al. |
| 5,857,179 A | 1/1999 | Vaithyanathan et al. |
| 5,884,302 A | 3/1999 | Ho |
| 5,895,450 A | 4/1999 | Sloo |
| 5,911,043 A | 6/1999 | Duffy et al. |
| 5,920,854 A | 7/1999 | Kirsch et al. |
| 5,924,094 A | 7/1999 | Sutter |
| 5,950,172 A | 9/1999 | Klingman |
| 5,950,189 A | 9/1999 | Cohen et al. |
| 5,953,718 A | 9/1999 | Wical |
| 5,974,412 A | 10/1999 | Hazlehurst et al. |
| 5,983,214 A | 11/1999 | Lang et al. |
| 5,983,216 A | 11/1999 | Kirsch et al. |
| 6,006,221 A | 12/1999 | Liddy et al. |
| 6,012,053 A | 1/2000 | Pant et al. |
| 6,021,409 A | 2/2000 | Burrows |
| 6,026,387 A | 2/2000 | Kesel |
| 6,026,388 A | 2/2000 | Liddy et al. |
| 6,029,161 A | 2/2000 | Lang et al. |
| 6,029,195 A | 2/2000 | Herz |
| 6,032,145 A | 2/2000 | Beall et al. |
| 6,035,294 A | 3/2000 | Fish |
| 6,038,610 A | 3/2000 | Belifore et al. |
| 6,064,980 A | 5/2000 | Jacobi et al. |
| 6,067,539 A | 5/2000 | Cohen |
| 6,078,892 A | 6/2000 | Anderson et al. |
| 6,094,657 A | 7/2000 | Halipern et al. |
| 6,098,066 A | 8/2000 | Snow et al. |
| 6,112,203 A | 8/2000 | Bharat et al. |
| 6,119,933 A | 9/2000 | Wong |
| 6,138,113 A | 10/2000 | Dean et al. |
| 6,138,128 A | 10/2000 | Perkowitz et al. |
| 6,169,986 B1 | 1/2001 | Bowman et al. |
| 6,185,558 B1 | 2/2001 | Bowman et al. |
| 6,192,360 B1 | 2/2001 | Dumais et al. |
| 6,202,068 B1 | 3/2001 | Kraay et al. |
| 6,233,575 B1 | 5/2001 | Agrawal |
| 6,236,977 B1 | 5/2001 | Verba et al. |
| 6,236,987 B1 | 5/2001 | Horowitz et al. |
| 6,236,991 B1 | 5/2001 | Frauenhofer et al. |
| 6,260,041 B1 | 7/2001 | Gonzalez et al. |
| 6,266,664 B1 | 7/2001 | Russell-Falla et al. |
| 6,269,362 B1 | 7/2001 | Broder et al. |
| 6,278,990 B1 | 8/2001 | Horowitz |
| 6,289,342 B1 | 9/2001 | Lawrence et al. |
| 6,304,864 B1 | 10/2001 | Liddy et al. |
| 6,308,176 B1 | 10/2001 | Bagshaw |
| 6,314,420 B1 | 11/2001 | Lang et al. |
| 6,334,131 B2 | 12/2001 | Chakrabarti et al. |
| 6,360,215 B1 | 3/2002 | Judd et al. |
| 6,362,837 B1 | 3/2002 | Ginn |
| 6,366,908 B1 | 4/2002 | Chong et al. |
| 6,377,946 B1 | 4/2002 | Okamoto et al. |
| 6,385,586 B1 | 5/2002 | Dietz |
| 6,393,460 B1 | 5/2002 | Gruen et al. |
| 6,401,118 B1 | 6/2002 | Thomas |
| 6,411,936 B1 | 6/2002 | Sanders |
| 6,418,433 B1 | 7/2002 | Chakrabarti et al. |
| 6,421,675 B1 | 7/2002 | Ryan et al. |
| 6,434,549 B1 | 8/2002 | Linetsky et al. |
| 6,493,703 B1 | 12/2002 | Knight et al. |
| 6,507,866 B1 | 1/2003 | Barchi |
| 6,513,032 B1 | 1/2003 | Sutter |
| 6,519,631 B1 | 2/2003 | Rosenschein et al. |
| 6,526,440 B1 | 2/2003 | Bharat |
| 6,539,375 B2 | 3/2003 | Kawasaki |
| 6,546,390 B1 | 4/2003 | Pollack et al. |
| 6,553,358 B1 | 4/2003 | Horvitz |
| 6,571,234 B1 | 5/2003 | Knight et al. |
| 6,571,238 B1 | 5/2003 | Pollack et al. |
| 6,574,614 B1 | 6/2003 | Kesel |
| 6,584,470 B2 | 6/2003 | Veale |
| 6,606,644 B1 | 8/2003 | Ford et al. |
| 6,622,140 B1 | 9/2003 | Kantrowitz |
| 6,640,218 B1 | 10/2003 | Golding et al. |
| 6,651,086 B1 | 11/2003 | Manber et al. |
| 6,654,813 B1 | 11/2003 | Black et al. |
| 6,658,389 B1 | 12/2003 | Alpdemir |
| 6,662,170 B1 | 12/2003 | Dom |
| 6,708,215 B1 | 3/2004 | Hingorani et al. |
| 6,721,734 B1 | 4/2004 | Subasic et al. |
| 6,751,606 B1 | 6/2004 | Fries et al. |
| 6,751,683 B1 | 6/2004 | Johnson et al. |
| 6,757,646 B2 | 6/2004 | Marchisio |
| 6,772,141 B1 | 8/2004 | Pratt et al. |
| 6,775,664 B2 | 8/2004 | Lang et al. |
| 6,778,975 B1 | 8/2004 | Anick et al. |
| 6,782,393 B1 | 8/2004 | Balabanovic et al. |
| 6,795,826 B2 | 9/2004 | Flinn et al. |
| 6,807,566 B1 | 10/2004 | Bates et al. |
| 6,928,526 B1 | 8/2005 | Zhu et al. |
| 6,978,292 B1 | 12/2005 | Murakami et al. |
| 6,983,320 B1 | 1/2006 | Thomas |
| 6,999,914 B1 | 2/2006 | Boerner et al. |
| 7,146,416 B1 | 12/2006 | Yoo |
| 7,188,078 B2 | 3/2007 | Arnett et al. |
| 7,188,079 B2 | 3/2007 | Arnett et al. |
| 7,197,470 B1 | 3/2007 | Arnett et al. |
| 7,269,590 B2 | 9/2007 | Hull et al. |
| 7,277,919 B1 | 10/2007 | Donoho |
| 7,359,894 B1 | 4/2008 | Liebman et al. |
| 7,657,523 B2 | 2/2010 | Ebanks |
| 8,166,026 B1* | 4/2012 | Sadler ............... G06F 17/30867 707/722 |
| 8,874,727 B2 | 10/2014 | Swahar |
| 2001/0042087 A1 | 11/2001 | Kephart et al. |
| 2002/0010691 A1 | 1/2002 | Chen |
| 2002/0032772 A1 | 3/2002 | Olstad et al. |
| 2002/0059258 A1 | 5/2002 | Kirkpatrick |
| 2002/0087515 A1 | 7/2002 | Swannack |
| 2002/0123988 A1 | 9/2002 | Dean et al. |
| 2002/0133481 A1 | 9/2002 | Smith et al. |
| 2002/0159642 A1 | 10/2002 | Whitney |
| 2003/0070338 A1 | 4/2003 | Roshkoff |
| 2003/0088532 A1 | 5/2003 | Hampshire |
| 2004/0024752 A1 | 2/2004 | Manber et al. |
| 2004/0059708 A1 | 3/2004 | Dean et al. |
| 2004/0059729 A1 | 3/2004 | Krupin et al. |
| 2004/0078432 A1 | 4/2004 | Manber et al. |
| 2004/0111412 A1 | 6/2004 | Broder |
| 2004/0122811 A1 | 6/2004 | Page |
| 2004/0199498 A1 | 10/2004 | Kapur et al. |
| 2004/0205482 A1 | 10/2004 | Basu et al. |
| 2004/0210561 A1 | 10/2004 | Shen |
| 2005/0049908 A2 | 3/2005 | Hawks |
| 2005/0114161 A1 | 5/2005 | Garg |
| 2005/0125216 A1 | 6/2005 | Chitrapura et al. |
| 2005/0154686 A1 | 7/2005 | Corston et al. |
| 2006/0004691 A1 | 1/2006 | Sifry |
| 2006/0041605 A1 | 2/2006 | King et al. |
| 2006/0042483 A1* | 3/2006 | Work ................... G06Q 10/00 101/91 |
| 2006/0069589 A1 | 3/2006 | Nigam et al. |
| 2006/0173819 A1 | 8/2006 | Watson |
| 2006/0173837 A1 | 8/2006 | Bertstis et al. |

(56) References Cited

U.S. PATENT DOCUMENTS

| | | |
|---|---|---|
| 2006/0206505 A1 | 9/2006 | Hyder et al. |
| 2007/0027840 A1* | 2/2007 | Cowling ............ G06F 17/30286 |
| 2007/0121843 A1 | 5/2007 | Atazky et al. |
| 2007/0198510 A1 | 8/2007 | Ebanks |
| 2007/0214121 A1 | 9/2007 | Ebanks |
| 2007/0239826 A1 | 10/2007 | Ducheneaut et al. |
| 2008/0077517 A1 | 3/2008 | Sappington |
| 2008/0103907 A1 | 5/2008 | Maislos et al. |
| 2008/0154931 A1 | 6/2008 | Jacobs et al. |
| 2008/0189169 A1* | 8/2008 | Turpin ................... G06Q 30/02 705/7.33 |
| 2008/0282324 A1 | 11/2008 | Hoal |
| 2009/0024747 A1 | 1/2009 | Moses et al. |
| 2009/0164624 A1 | 6/2009 | Metcalf et al. |
| 2009/0319359 A1 | 12/2009 | Soza et al. |
| 2010/0094869 A1 | 4/2010 | Ebanks |
| 2010/0104081 A1 | 4/2010 | Berman et al. |
| 2010/0121857 A1 | 5/2010 | Elmore et al. |
| 2010/0228614 A1 | 9/2010 | Zhang et al. |
| 2010/0241580 A1 | 9/2010 | Schleier-Smith |
| 2013/0173368 A1* | 7/2013 | Boutin .............. G06F 17/30283 705/14.16 |

FOREIGN PATENT DOCUMENTS

| | | |
|---|---|---|
| JP | 2005235118 | 9/2005 |
| JP | 2007128163 | 5/2007 |
| JP | 2007334591 | 12/2007 |
| JP | 2008305258 | 12/2008 |
| JP | 2012502343 | 1/2012 |
| WO | 00/17824 | 3/2000 |
| WO | 2009105277 | 8/2009 |
| WO | 2010026581 | 3/2010 |

OTHER PUBLICATIONS

Wilson et al., "User Interactions in Social Networks and their Implications", EuroSys '09, Apr. 1-3, 2009 (14 pages).
Examination Report, IP Australia, issued in connection with application No. AU 2011202431, on Jul. 4, 2012 (6 pages).
Office Action, Canadian Intellectual Property Office, issued in connection with application No. CA 2,740,499, on Sep. 11, 2013 (4 pages).
First Office Action and Translation, Chinese Patent Office, issued in connection with application No. CN 201110143610.3, on Aug. 24, 2012 (9 pages).
Translation of Second Office action, Chinese Patent Office, issued in connection with application No. CN 201110143610.3, on Aug. 16, 2013 (5 pages).
Notice of Reasons for Rejection and English Summary of Rejections, Japanese Patent Office, issued in connection with application No. JP 2011-110629, on Nov. 27, 2012 (6 pages).
Notice of Allowance and Fees Due in connection with U.S. Appl. No. 11/710,742, mailed from the United States Patent and Trademark Office on Jul. 26, 2010, 21 pages.
United States Patent and Trademark Office, Interview Summary, issued in connection with U.S. Appl. No. 11/651,661, on Aug. 11, 2009 (3 pages).
Adamic et al., The political blogosphere and the 2004 U.S. election: Divided they blog, Proceedings WWW-2005 2nd Annual Workshop on the Weblogging Ecosystem, 2005, Chiba, Japan, 16 pages.
Adar et al., Implicit structure and dynamics of blogspace, Proceedings WWW-2004 Workshop on the Weblogging Ecosystem, 2004, New York, NY, 8 pages.
Aliod, Diego Mol Ia, et al., "A Real World Implementation of Answer Extraction", Department of Computer Science, University of Zurich, Winterthurerstr., 1998, 190, CH-8057 Zurich, Switzerland, pp. 1-6.
Archived version of www.bizrate.com, Jan. 1999, 22 pages.
Bishop, Mike, "ARROW Question/Answering Systems", Language Computer Corporation, 1999, pp. 1-3.

Blum, Avrim, "Empirical support for winow and weighted-majority algorithms. Results on a calendar scheduling domain," in Machine Learning, 1997, pp. 5-23, vol. 26, Kluwer Academic Publishers, Boston, USA.
Bournellis, Cynthia, "Tracking the hits on Web Sites", Communications International. London: Sep. 1995. vol. 22, Issue 9, 3 pages.
Cohen, William W., "Data Integration using similarity joins and a word-based information representation language," in ACM Transactions on Information Systems, Jul. 2000, pp. 288-321, vol. 18, No. 3.
Cohn et al., "Active Learning with Statistical Models", Journal of Artificial Intelligence Research 4 (1996), 129-145, AI Access Foundation and Morgan Kaufmann Publishers, USA.
Dagan et al., "Mistake Driven learning in text categorization," in EMNLP '97, 2nd Conference on Empirical Methods in Natural Language Processing, 1997, 9 pages.
Delahaye Group to Offer Net Bench: High Level Web-Site Qualitative Analysis and Reporting; Netbench Builds on Systems provided by 1/PRO and Internet Media Services, 1995 business Wire, Inc., May 31, 1995, 3 pages.
www.dialogic.com as archived on May 12, 2000, 34 pages.
Dillon et al., Marketing research in a Marketing Environment, 1987, Times Mirror/Mosby College, USA, pp. 98, 286, 288.
Farber, Dave. "IP: eWatch and Cybersleuth," Jun. 29, 2000, retrieved from [URL: http:ffwww.interesting-people.org/ archives/interesting-people/200006/msg00090.html], 4 pages.
Freund et al., "Selective Sampling Using the Query by Committee Algorithm", Machine Learning 28 (1997), 133-168, Kluwer Academic Publishers, The Netherlands.
Glance et al., Analyzing online discussion for marketing intelligence, Proceedings WWW-2005 2nd Annual Workshop on the Weblogging Ecosystem, 2005, Chiba, Japan, 2 pages.
Glance et al., Deriving marketing intelligence from online discussion, 11th ACM SIGKDD International Cont. on Knowledge Discovery and Data Mining, Aug. 21-24, 2005, Chicago, IL, 10 pages.
Grefenstette et al., "Validating the coverage of lexical resources for affect analysis and automatically classifying new words along semantic axes," Chap. X, Mar. 2004, pp. 1-15.
Harabagiu, Sanda M., "An Intelligent System for Question Answering", University of Southern California; Modlovan, Dan, Southern Methodist University, 2004, pp. 1-5.
Harabagiu, Sanda M. et al., "Experiments with Open-Domain Textual Question Answering", Department of Computer Science and Engineering at Southern Methodist Universtity, 2000, pp. 1-7.
Harabagiu, Sanda M. et al., "Mining Textual Answers with Knowledge-Based Indicators", Department of Computer Science and Engineering at Southern MethodistC University, 2000, pp. 1-5.
Joachims, Thorsten, "Text categorization with support vector machines: Learning with many relevant features," in Machine Learning: ECML-98, Tenth European Conference on Machine Learning, pp. 137-142, 1998.
Katz, Boris, "From Sentence Processing to Information Access on the World Wide Web: START Information Server", MIT Artificial Intelligence Laboratory, Feb. 27, 1997, 20 pages.
Kleppner, Advertising Procedure, 6th edition, 1977, Prentice-Hall, Inc., Englewood Cliffs, NJ, 3 pages.
Kotler, Marketing Management, 1997, PrenticeHallInternationalInc., Upper Saddle River, NJ, 10 pages.
Lenz, Mario, et al., "Question answering with Textual CBR", Department of Computer Science, Humboldt University Berlin, D-10099 Berlin, pp. 1-12, 1998.
Littlestone, Nick, "Learning quickly when irrelevant attributes abound: A new linear-threshold algorithm," in Machine Learning, 1988, pp. 285-318, vol. 2, Kluwer Academic Publishers, Boston, USA.
Marlow, Audience, structure and authority in the weblog community, International Communication Association Conference, MIT Media Laboratory, 2004, New Orleans, LA, 9 pages.
McCallum et al., "Text Classification by Bootstrapping with the Keywords, EM and Shrinkage", Just Research and Carnegie Mellon U., circa 1999, Pittsburgh, PA, USA, 7 pages.

(56) References Cited

OTHER PUBLICATIONS

Mclachlan, Geoffrey J. And Krishnan, Thriyambakam, The EM Algorithm and Extensions, Copyright 1997, 300 pages, John Wiley & Sons, Inc., New York, USA.

Modlovan, Dan et al., "LASSO: A Tool for Surfing the Answer Net", Department of Computer Science and Engineering at Southern Methodist University, pp. 1-9, 1999.

Nanno et al., Automatic collection and monitoring of Japanese Weblogs, Proceedings WWW-2004 Workshop on the weblogging Ecosystem, 2004, New York, NY, 7 pages.

Pang et al., "Thumbs up? Sentiment classification using machine learning techniques," in Proceedings of EMNLP 2002,2002, 8 pages.

Reinartz, Customer Lifetime Value Analysis: An Integrated Empirical Framework for Measurement and Explanation, dissertation: Apr. 1999, 66 pages.

Thomas, International Marketing, 1971, International Textbook Company, Scranton, PA, 3 pages.

Tull et al., Marketing Research Measurement and Method, 1984, MacMillan Publishing Company, New York, NY, 9 pages.

Voorhees, Ellen M., "The TREC-8 Question Answering Track Report", National Institute of Standards and Technology, pp. 1-6, 1999.

Wiebe et al., "Identifying collocations for recognizing opinions, in proceedings of ACUEACL '01 workshop on collcation," (Toulouse, France), Jul. 2001, 9 pages.

Word of Mouth Research Case Study, "The Trans Fat Issue, Analysis of online consumer conversation to understand hwo the Oreo lawsuit impacted word-of-mouth on trans fats.", Aug. 16, 2004, 35 pages.

Yang, Yiming, "An evaluation of statistical approacches to text categorization," Information Retrieval 1 (1/2), 12 pages, 1999.

www.zagat.com archived on Apr. 29, 1999, 34 pages.

p. 34 of archived version of www.zagat.com, Feb. 1999.

David Chaum & Jan-Hendrik Evertse, "A Secure and Privacy-Protecting Protocol for Transmitting Personal Information Between Organizations", A.M. Odlyzko {Ed.}: Advances in Cryptology, CRYPTO '86, LNCS 263, 1987, 51 pages.

David L. Chaum, "Untraceable Electronic Mail, Return Addresses, and Digital Pseudonymns", Communication of the ACM, vol. 24, No. 2, 1981, pp. 84-88.

European Search Report dated Sep. 26, 2007, directed to counterpart EP application No. 02744622.8, 3 pages.

Housley et al., "Internet X.509 Public Key Infrastructure Certificate and CRL Profile", Jan. 1999, Network Working Group Request for Comments: 2459, 121 pages.

International Bureau, International Preliminary Report on Patentability, from corresponding International Patent Applicaton No. PCT/IL2006/000905, mailed on Jul. 2, 2007, (4 pages).

International Search Report dated Jul. 1, 2008, in WO PCT/US2007/021035, 3 pages.

Interview Summary in U.S. Appl. No. 11/651,661, date mailed, May 6, 2009, 2 pages.

International Preliminary Report on Patentability dated Jun. 19, 2007, in PCT/US2005/035321, 4 pages.

Notice of Allowance issued in U.S. Appl. No. 11/651,661, mailed May 19, 2009, 29 pages.

Notice of Allowance issued in U.S. Appl. No. 11/517,417, mailed May 29, 2009, 7 pages.

Notice of Allowance issued in U.S. Appl. No. 11/710,742, mailed Jun. 8, 2009, 10 pages.

Official Action dated Apr. 7, 2009, in U.S. Appl. No. 11/454,301, 17 pages.

Official Action dated Apr. 21, 2009, in U.S. Appl. No. 11/897,984, 18 pages.

Official Action dated Apr. 23, 2008, in U.S. Appl. No. 11/364,169, 10 pages.

Official Action dated Apr. 28, 2005, in U.S. Appl. No. 09/879,220, 16 pages.

Official Action dated Apr. 29, 2009, in U.S. Appl. No. 10/801,758, 42 pages.

Official Action dated Apr. 5, 2006, in U.S. Appl. No. 11/239,632, 9 pages.

Official Action dated Apr. 7, 2006, in U.S. Appl. No. 11/239,695, 9 pages.

Official Action dated Aug. 19, 2008, in U.S. Appl. No. 11/517,418, 9 pages.

Notice of Allowance dated Aug. 21, 2008, in U.S. Appl. No. 11/245,542, 18 pages.

Official Action dated Aug. 3, 2007, in U.S. Appl. No. 11/651,661, 17 pages.

Official Action dated Aug. 7, 2008, in U.S. Appl. No. 11/710,742, 12 pages.

Notice of Allowance dated Dec. 1, 2006, in U.S. Appl. No. 09/879,220, 3 pages.

Official Action dated Dec. 2, 2004, in U.S. Appl. No. 09/879,220, 15 pages.

Notice of Allowance dated Dec. 16, 2008, in U.S. Appl. No. 11/245,542, 4 pages.

Notice of Allowance dated Dec. 18, 2006, in U.S. Appl. No. 11/239,632, 3 pages.

Official Action dated Dec. 23, 2008, in U.S. Appl. No. 11/372,191, 6 pages.

Notice of Allowance dated Dec. 3, 2006, in U.S. Appl. No. 11/239,695, 3 pages.

Official Action dated Dec. 4, 2008, in U.S. Appl. No. 11/651,661, 10 pages.

Notice of Allowance dated Dec. 8, 2008, in U.S. Appl. No. 11/710,742, 10 pages.

Notice of Allowance dated Feb. 24, 2003, in U.S. Appl. No. 09/796,961, 4 pages.

Official Action dated Jan. 21, 2009, in U.S. Appl. No. 11/897,984, 3 pages.

Notice of Allowance dated Jan. 24, 2007, in U.S. Appl. No. 09/686,516, 3 pages.

Official Action dated Jan. 28, 2005, in U.S. Appl. No. 09/686,516, 19 pages.

Notice of Allowance dated Jan. 30, 2009, in U.S. Appl. No. 11/710,742, 10 pages.

Advisory Action dated Jul. 10, 2008, in U.S. Appl. No. 11/364,169, 2 pages.

Official Action dated Jul. 21, 2004, in U.S. Appl. No. 09/695,016, 27 pages.

Official Action dated Jun. 11, 2007, in U.S. Appl. No. 11/364,169, 8 pages.

Official Action dated Jun. 12, 2008, in U.S. Appl. No. 11/245,542, 9 pages.

Official Action dated Jun. 29, 2005, in U.S. Appl. No. 09/686,516, 21 pages.

Official Action dated Jun. 4, 2008, in U.S. Appl. No. 11/651,661, 11 pages.

Official Action dated Mar. 28,2006, in U.S. Appl. No. 09/879,220, 19 pages.

Official Action dated Mar. 7, 2008, in U.S. Appl. No. 10/801,758, 31 pages.

Official Action dated May 10, 2006, in U.S. Appl. No. 09/686,516, 34 pages.

Official Action dated May 19, 2005, in U.S. Appl. No. 09/695,016, 13 pages.

Official Action dated May 22, 2008, in U.S. Appl. No. 11/897,984, 17 pages.

Official Action dated Nov. 13, 2008, in U.S. Appl. No. 11/897,984, 20 pages.

Official Action dated Nov. 2, 2005, in U.S. Appl. No. 09/695,016, 13 pages.

Notice of Allowance dated Nov. 21, 2007, in U.S. Appl. No. 11/239,696, 3 pages.

Official Action dated Nov. 22, 2005, in U.S. Appl. No. 09/686,516, 25 pages.

Official Action dated Oct. 1, 2008, in U.S. Appl. No. 10/801,758, 40 pages.

(56) References Cited

OTHER PUBLICATIONS

Official Action dated Oct. 3, 2007, in U.S. Appl. No. 11/710,742, 10 pages.
Notice of Allowance dated Oct. 8, 2008, in U.S. Appl. No. 11/245,542, 5 pages.
Official Action dated Oct. 9, 2007, in U.S. Appl. No. 11/245,542, 11 pages.
Official Action dated Sep. 12, 2007, in U.S. Appl. No. 11/239,696, 8 pages.
Official Action dated Sep. 18, 2008, in U.S. Appl. No. 11/454,301, 17 pages.
Notice of Allowance dated Sep. 21, 2006, in U.S. Appl. No. 11/239,632, 3 pages.
Notice of Allowance dated Sep. 21, 2006, in U.S. Appl. No. 11/239,695, 3 pages.
Official Action dated Sep. 22, 2006, in U.S. Appl. No. 11/239,696, 11 pages.
Written Opinion issued in PCT/US2007/021035, date mailed Jul. 1, 2008, 8 pages.
Official Action dated Dec. 17, 2008, in U.S. Appl. No. 11/517,417, 6 pages.
eWatch's archived web site retrieved from [URL: http://web.archive.org/web/19980522190526/www.ewatch.com] on Sep. 8, 2004, archived May 22, 1998, 48 pages.
Web site describing CyberSleuth retrieved from [URL: http://www.interesting-people.org/archivesIinteresting-people/200006/msg00090.html] on Jan. 21, 2005, dated Jun. 29, 2000, 6 pages.
NetCurrent's web site, retrieved from [URL: http:/lweb.archive.org/web/20000622024845/www.netcurrents.com] on Jan. 17, 2005, archived on Jun. 22, 2000 and Sep. 18, 2000, 17 pages.
Trigaux, Robert, "Cyberwar Erupts Over Free Speech Across Florida, Nation." Knight-Ridder Tribune Business News, May 29, 2000, 4 pages.
Khan et al, Categorizing Web Documents Using Competitive Learning: An Ingrediant of a Personal Adaptive Agent, IEEE 1997, 4 pages.
Nakashima et al, Information Filtering for the Newspaper, IEEE 1997, 4 pages.
Translation of Examination Report from the German Patent and Trademark Office, for DE Patent Application No. 102011103015.1, Dec. 6, 2011, 6 pages.
Zhang et al., "Ways of Identifying the Opinion Leaders in Virtual Communities," International Journal of Business and Management, pp. 21-27, Jul. 2008. (7 pages).

"Finding Key Opinion Leaders Using Large Scale Social Network Analysis—A Comparative Analysis of Methods for Finding Key Opinion Leaders," LNX Research, 2007. (6 pages).
Garton et al., "Studying Online Social Networks," JCMC 3 (1) Jun. 1997 (29 pages).
"Introducing Google Buzz," The Official Google Blog, Feb. 2010, retrieved from "http://googleblog.blogspot.com/2010/02/introducing-google-buzz.html" on Jul. 13, 2010 (5 pages).
Wasserman et al., "Social Network Analysis: Methods and Applications," Cambridge University Press, 1994, Table of Contents retrieved from "http://catdir.loc.gov/catdir/toc/cam026/94020602.html" on Mar. 7, 2011 (1 page).
Rogers et al., "Communication Networks: Toward a new paradigm for research," Free Press, 1981, Abstract retrieved from "http://74.125.155.132/scholar?q=cache:1wL6PfsGTDMJ:scholar.google.com/" on Mar. 7, 2011 (1 page).
United States Patent and Trademark Office, Non-Final Office Action, issued in connection with U.S. Appl. No. 12/835,563, Jun. 20, 2012, 28 pages.
United States Patent and Trademark Office, Non-Final Office Action, issued in connection with U.S. Appl. No. 12/835,563, Feb. 26, 2013, 58 pages.
United States Patent and Trademark Office, Notice of Allowance, issued in connection with U.S. Appl. No. 12/835,563, Sep. 19, 2013, 19 pages.
United States Patent and Trademark Office, Notice of Allowance, issued in connection with U.S. Appl. No. 12/835,563, Jun. 16, 2014, 25 pages.
Reguly, "Caveat emptor rules on the Internet," Apr. 10, 1999, 2 pages, Bell Globemedia Publishing Inc.
French Patent Office, Office Action, issued in connection with Application No. 1154673, Oct. 22, 2014, 5 pages.
Canadian Intellectual Property Office, Office Action, issued in connection with Application No. 2,740,499, Nov. 12, 2014, 13 pages.
IP Australia, Notice of Acceptance, issued in connection with Application No. 2013203795, Jun. 24, 2015, 2 pages.
IP Australia, Patent Examination Report No. 2, issued in connection with Application No. 2013203795, Jul. 14, 2014, 3 pages.
IP Australia, Patent Examination Report No. 3, issued in connection with Application No. 2013203795, Feb. 27, 2015, 3 pages.
German Patent and Trademark Office, Office Action, issued in connection with German Patent Application No. 10 2011 103 015.1, Nov. 26, 2015, (12 pages).
Japanese Government, IP Japan,Decision to Grant issued in connection with Application No. 2011110629, on Jul. 2, 2013, (3 pages).

\* cited by examiner

| INT 1 | i | Di1 | Di2 | Di3 | Di4 | Di5 | Di6 | Di7 | Di8 | Di9 | Di10 | Di11 |
|---|---|---|---|---|---|---|---|---|---|---|---|---|
| i |  | 1 | 0 | 0 | 0 | 0 | 0 | 0 | 0 | 0 | 0 | 0 |
| Di1 | 0 | 0 | 0 | 0 | 0 | 0 | 0 | 0 | 0 | 0 | 0 | 0 |
| Di2 | 0 | 0 | 0 | 0 | 0 | 0 | 0 | 0 | 0 | 0 | 0 | 0 |
| Di3 | 0 | 0 | 0 | 0 | 0 | 0 | 0 | 0 | 0 | 0 | 0 | 0 |
| Di4 | 0 | 0 | 0 | 0 | 0 | 0 | 0 | 0 | 0 | 0 | 0 | 0 |
| Di5 | 0 | 0 | 0 | 0 | 0 | 0 | 0 | 0 | 0 | 0 | 0 | 0 |
| Di6 | 0 | 0 | 0 | 0 | 0 | 0 | 0 | 0 | 0 | 0 | 0 | 0 |
| Di7 | 0 | 0 | 0 | 0 | 0 | 0 | 0 | 0 | 0 | 0 | 0 | 0 |
| Di8 | 0 | 0 | 0 | 0 | 0 | 0 | 0 | 0 | 0 | 0 | 0 | 0 |
| Di9 | 0 | 0 | 0 | 0 | 0 | 0 | 0 | 0 | 0 | 0 | 0 | 0 |
| Di10 | 0 | 0 | 0 | 0 | 0 | 0 | 0 | 0 | 0 | 0 | 0 | 0 |
| Di11 | 0 | 0 | 0 | 0 | 0 | 0 | 0 | 0 | 0 | 0 | 0 | 0 |

METHODS, APPARATUS, AND ARTICLES OF MANUFACTURE TO DETERMINE A NETWORK EFFICACY

RELATED APPLICATIONS

This patent arises from a continuation of U.S. patent application Ser. No. 12/835,563, filed Jul. 13, 2010, which claims priority to Indian Patent Application Serial Number 1486/Che/2010, filed on May 31, 2010. The entireties of U.S. patent application Ser. No. 12/835,563 and Indian Patent Application Serial Number 1486/Che/2010 are hereby incorporated by reference.

FIELD OF THE DISCLOSURE

This disclosure relates generally to measuring social networking and, more particularly, to methods, apparatus, and articles of manufacture to determine a network efficacy.

BACKGROUND

Social networking has expanded to the online world and enabled more people to stay in contact with larger numbers of personal contacts over great distances. Some social networking web sites allow members to create their own websites, complete with member-provided profile information and ways to contact the member. Social networking web sites keep track of a member's list of contacts, which may be browsed by the member and/or easily recalled via searching the list of contacts. In general, social networking may result in much larger networks of contacts for some users than was previously manageable.

DETAILED DESCRIPTION

Figure 1:
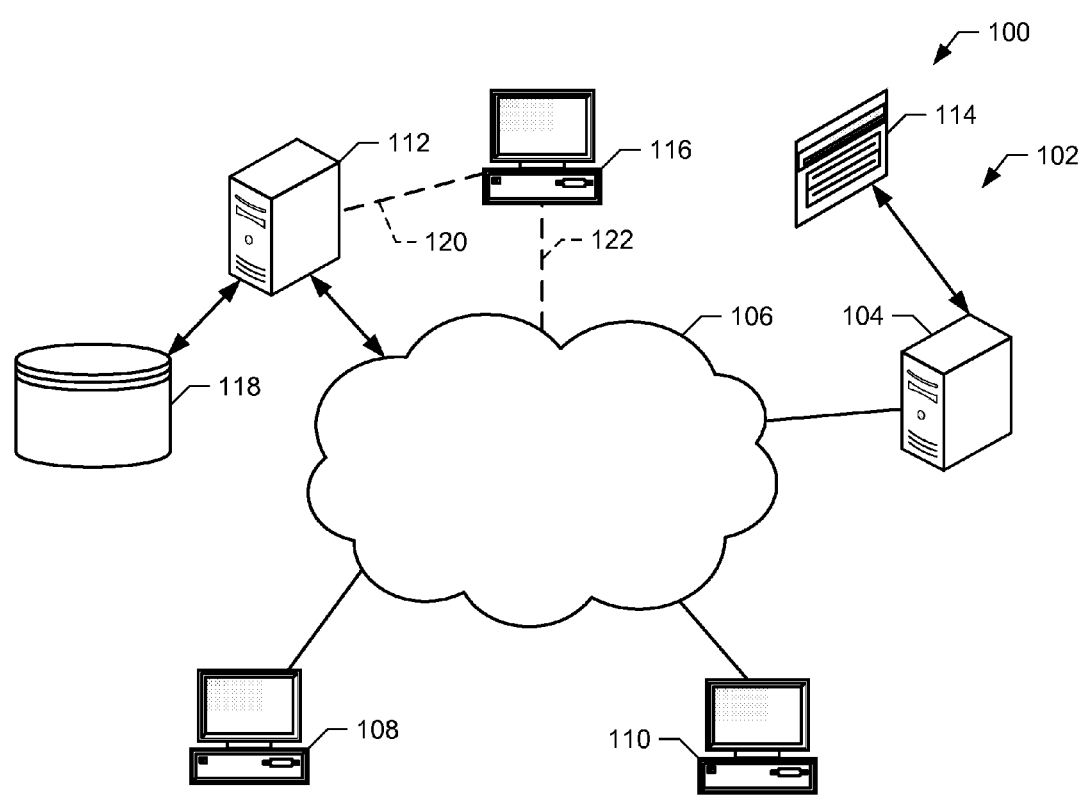
FIG. 1 illustrates an example computer network to implement an online social networking website.

Although the example systems described herein include, among other components, software executed on hardware, such description is merely illustrative and should not be considered as limiting. For example, it is contemplated that any or all of the disclosed hardware and/or software components could be embodied exclusively in dedicated hardware, exclusively in software, exclusively in firmware or in some combination of hardware, firmware, and/or software.

The example systems, methods, and articles of manufacture described herein may be used to identify popular or influential participants on an online social networking website (also referred to as a social networking site, or SNS), such as Facebook®, Orkut®, MySpace®, Flickr®, etc. In particular, the example systems, methods, and articles of manufacture described below may be used to facilitate marketing products and services more effectively by identifying users on a social networking site who may result in higher advertisement conversion rates (e.g., sales per advertisement view) and, thus, a better return on marketing investment. The example systems, methods, and articles of manufacture described below may also be used to identify popular participants in other types of online interaction applications such as electronic mail (email), weblogs, and/or other types of user-generated content web sites.

In general, social network analysis refers to mapping and/or measuring the connections and/or relationships between entities (e.g., individuals, groups, organizations). Social network analysis may measure social network activity by determining which individuals are directly connected and then determining how many direct connections one individual is removed from another individual. For example, if individual A is a friend of a friend C of individual B (and is not a direct friend or contact of B), A and B are separated by two degrees (e.g., a first link (degree) between A and an intermediate friend C and a second link (degree) between the intermediate friend C and B). An opinion leader in social networking refers to a person who is highly influential in a local network. Such a person is someone whom others may seek out for advice and/or information. Similarly, on social networking sites where networks may be much more geographically widespread than, for example, local networks, some users of a social networking site may have more connections than other users. Thus, some examples systems, methods, and articles of manufacture disclosed herein measure direct and/or indirect connections of a user on a social networking site and generate a connectedness score representative of a user's connectedness. In some examples, the connectedness score is based on a rank of the user with other users.

Some example systems, methods, and articles of manufacture disclosed herein identify the more popular and/or influential users on an online social networking site. In online social networking, some particular users may have a high number of connections. As used herein, the term "user" may refer to an individual, group, organization, business, governmental unit, and/or any other real or fictitious unit or entity that may be represented in social networking. In some examples, a connection identifier determines a number of connections for a specified user. In some examples, the number of connections is a sum of first-degree, second-degree, and/or third-degree connections. The example connection identifier may further determine a number of the connections that are restricted and may decrease the value of restricted connections. A restricted connection refers to a connection (direct or indirect) between individuals where at least one of the individuals has chosen to block some or all types of communications between the individuals. For example, if one of the individuals declines to be updated with the other individual's status, the connection may be considered restricted.

The interactivity of a user refers to the number of interactions between the user and the contacts, connections, and/or friends of the user occurring on a social networking site. An interaction may be any form of activity taking place on a social networking site and/or any response to an activity on a social networking site, including but not limited to: posting to a wall (e.g., a public or semi-public posting board belonging to a user to which anyone with the proper permissions may write or post); sending private messages; chatting; viewing or posting images, videos, and/or other media; commenting on another user's posted status; viewing the friends of a user; notifications of user status updates; and/or posting the results of an application (e.g., event invitations, game scores, etc.). An interactivity score of a user is a normalized and/or ranked score based on the interactivity of a user compared to the interactivities of other users on the social networking site.

Further, in general some users tend to have a higher level of activity and/or interactivity on the social networking site. Due to the highly interactive nature of social networking sites, activity by a user is often in the form of interaction (e.g., messaging a community, to and/or from one or more other entities) with other users. In some examples, an interactivity monitor determines a level of interactivity of a user on the social networking site. Interactivity may refer to any type of interactivity between a user and one or more of the user's direct and/or indirect connections. As used herein, each action in a social transaction is an interaction. Thus, a uni-directional action (e.g., an action from user A to user B) has one interaction, a bidirectional transaction has two interactions (e.g., an action from A to B is a first interaction and a response from B to A is a second interaction), and a multi-directional interaction includes 3 or more interactions. In some examples, the interactivity monitor counts each interaction between users. Thus, for example, an interaction from a user directed at 10 other users counts as 10 interactions. In some examples the interactivity monitor counts responses to an interaction by generating a data structure (e.g., a relational matrix, a vector) for the interaction and updating the data structure to count one or more response interactions after they are performed.

In some examples, a user ranker determines an overall rank of a user on a social networking site based on the interactivity of a user and the connectedness of the user. The rank of a user may be indicative of the user's popularity on the social networking site, because popular users may be more likely to be more connected with other users and/or may be more likely to be more active on the social networking site. The connectedness of a user refers to the weighted or unweighted number of users to which the user is directly or indirectly connected, whereas the connectedness score is a normalized or ranked (e.g., percentile ranked) score based on the connectedness of the user compared to the connectedness of other users. In some examples, the interactivity and/or the connectedness of the user are converted into scores. Example scores include a percentile rank of the user for the interactivity of the user and a percentile rank of the user for connectedness. In some examples, the interactivity score and the connectedness score are weighted equally to determine an overall (e.g., composite) user rank. In other examples the interactivity score and the connectedness score are weighted differently and then combined to determine the overall (e.g., composite) rank. For example, a first user with a relatively high interactivity score and a relatively low connectedness score and/or a second user with a relatively low interactivity score and a relatively high connectedness score may both be ranked lower than a third user having a high interactivity score and a high connectedness score.

Some example systems, methods, and articles of manufacture described herein may employ the user rank to select advertisements for presentation to the corresponding user and/or to associate with views of a user's profile by other users. Instead of being used to select advertisements directly, the ranks can be provided by the entity determining the rank in a report to advertisers. The advertisers may then use the rank alone or in combination with other data to select advertisements. In some examples, an advertiser may identify and/or select users based on the user interactivity score, the user connectedness score, and/or the overall user rank. In some examples, the identified user(s) may be propositioned to endorse and/or otherwise associate with the advertiser's product(s) and/or service(s).

In some examples, the connectedness score(s), the interactivity score(s), and/or the ranking may be used as a measure of efficacy of an online social networking site. In some examples, a user's score(s) and/or overall rank may be presented to the user to inform him or her of the same. For example, some users may perceive a challenge to increase their score(s) and/or to improve their ranking(s), thereby potentially increasing the usage of the site by some users. User exposure to advertising may be affected by usage of the site and, therefore, increased usage of the site by users may increase the advertising exposure by those users and generate increased revenue to the site. The network efficacy score may also allow a social networking site to evaluate its advertising pricing structure to reflect a marketing appeal of the social networking site to advertisers.

FIG. 1 illustrates an example computer network 100 to implement an online social networking site 102. The network 100 includes a host server 104 that may be implemented, for example, using web hosting servers and/or software. The host server 104 is connected via a wide area network 106, such as the Internet, to other computers 108 and 110 and/or social networking monitor(s) 112. The computers 108 and 110 may be employed by users of the social networking site 102 (or others) to view a web page 114 via web browser application(s) (e.g., Microsoft's Internet Explorer web browser) executed on the computers 108 and 110. Upon receiving a request from the computer 108 or 110 via the wide area network 106, the example host server 104 retrieves data corresponding to the request and transmits data representing the requested web page 114 to the requesting computer 108, 110. The host server 104 may further receive messages from users of the computers 108 and 110 that include requests for information associated with one or more interactions between users and/or between a user and the social networking site 102. Example interactions include, but are not limited to, posting content to a wall (e.g., a public or semi-public posting board belonging to a user to which anyone with the proper permissions may write or post); sending private messages; chatting; viewing or posting images, videos, and/or other media; commenting on a user's status; viewing the friends of a user; notifications of user status updates; and/or posting the results of an application (e.g., event invitations, game scores, etc.).

The example social networking monitor 112 of FIG. 1 also accesses the social networking site 102 via the wide area network 106. Alternatively, the monitor 112 may be directly connected to, or integrated within, the social networking site 102. In some examples, the social networking site 102 provides one or more application program interfaces (APIs) that allow the social networking monitor 112 to access data contained on the social networking site 102 that is provided by users. The social networking monitor 112 may be accessed by a monitor terminal 116 that is remote from the social networking monitor 112. For example, a client (e.g., an advertiser) may use the social networking monitor 112 to identify one or more users of the social networking site 102 based on the connectedness and/or the interactivity of the user(s) by accessing the social networking monitor 112 and/or submitting a request via the monitor terminal 116. The monitor terminal 116 may be directly connected 120 to the social networking monitor 112 and/or indirectly connected 122 to the monitor terminal (e.g., via the wide area network 106).

In the example of FIG. 1, the social networking monitor 112 periodically and/or a periodically queries the social networking site 102 to determine an overall rank, an interactivity score and/or a connectedness score of one or more users of the social networking site 102. For example, the social networking monitor 112 may collect data from the social networking site 102, analyze the collected data, and update a database 118 that includes an identification, an interactivity, an interactivity score, a connectedness, a connectedness score, and/or a rank (e.g., an overall rank among users of the social networking site 102) for one or more of the social networking users. The example database 118 of FIG. 1 associates the identification of a user with his or her respective interactivity score, connectedness score, and/or rank(s). The database 118 may additionally or alternatively store the analyzed interactivity data and/or connectedness data for the users. When the social networking monitor 112 identifies a new user on the social networking site 102, the social networking monitor 112 generates a new entry in the database 118 corresponding to the user and populates the respective fields with the interactivity score(s), connectedness score(s), and/or rank(s).

Figure 2:
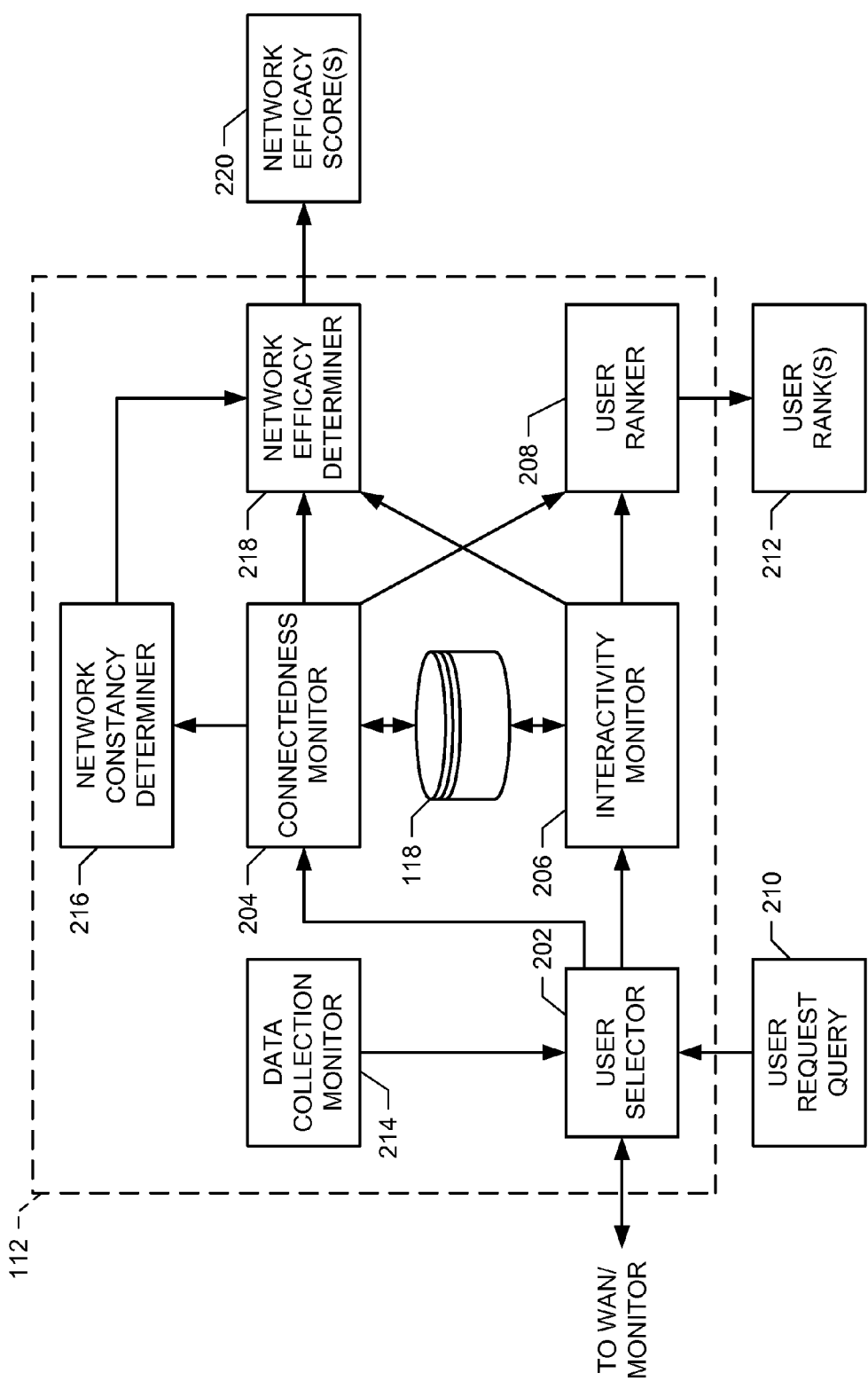
FIG. 2 is a more detailed block diagram of the example social networking monitor of FIG. 1.

FIG. 2 is a more detailed block diagram of the example social networking monitor 112 of FIG. 1. The example social networking monitor 112 of FIG. 2 receives a request for identification of one or more listings of users of the social networking site 102 (FIG. 1) based on one or more criteria. The monitor 112 ranks the users of the social networking site 102 based on the received criteria, and provides one or more lists identifying the ranked users and/or corresponding user information to the requester. To this end, the example social networking monitor 112 of FIG. 2 includes a user selector 202, a connectedness monitor 204, an interactivity monitor 206, and a user ranker 208. The example social networking monitor 112 is further shown as including the database 118 of FIG. 1. However, the database 118 may be external to and in communication with the social networking monitor 112.

The example user selector 202 receives a user request query 210 (e.g., from the monitor terminal 116 of FIG. 1). The user request query 210 may include a request for one or more of, for example, a connectedness of one or more users, a connectedness score of one or more users, an interactivity of one or more users, an interactivity score of one or more users, an overall rank of one or more users, and/or a list of users and/or traits (e.g., demographic profile, personal social networking site activity, etc.) of users having specified connectedness, connectedness scores, interactivity, interactivity scores, and/or ranks. Additional traits of users may be obtained via, for example, processing profile information provided to the social networking site 102 by users, screen scraping publicly available information from user profiles, and/or using other methods of determining user traits.

The user selector 202 interprets the user request query 210 and, based on the query 210, determines which of the connectedness monitor 204 and/or the interactivity monitor 206 are to generate data and/or retrieve previously generated data from the database 118. In general, the connectedness monitor 204 determines a number of users to which each user is directly and/or indirectly connected via the social networking site 102. The connectedness monitor 204 then determines a connectedness and a connectedness score of a user. A more detailed description of the operation of the connectedness monitor 204 is provided below with reference to FIG. 3.

Figure 3:
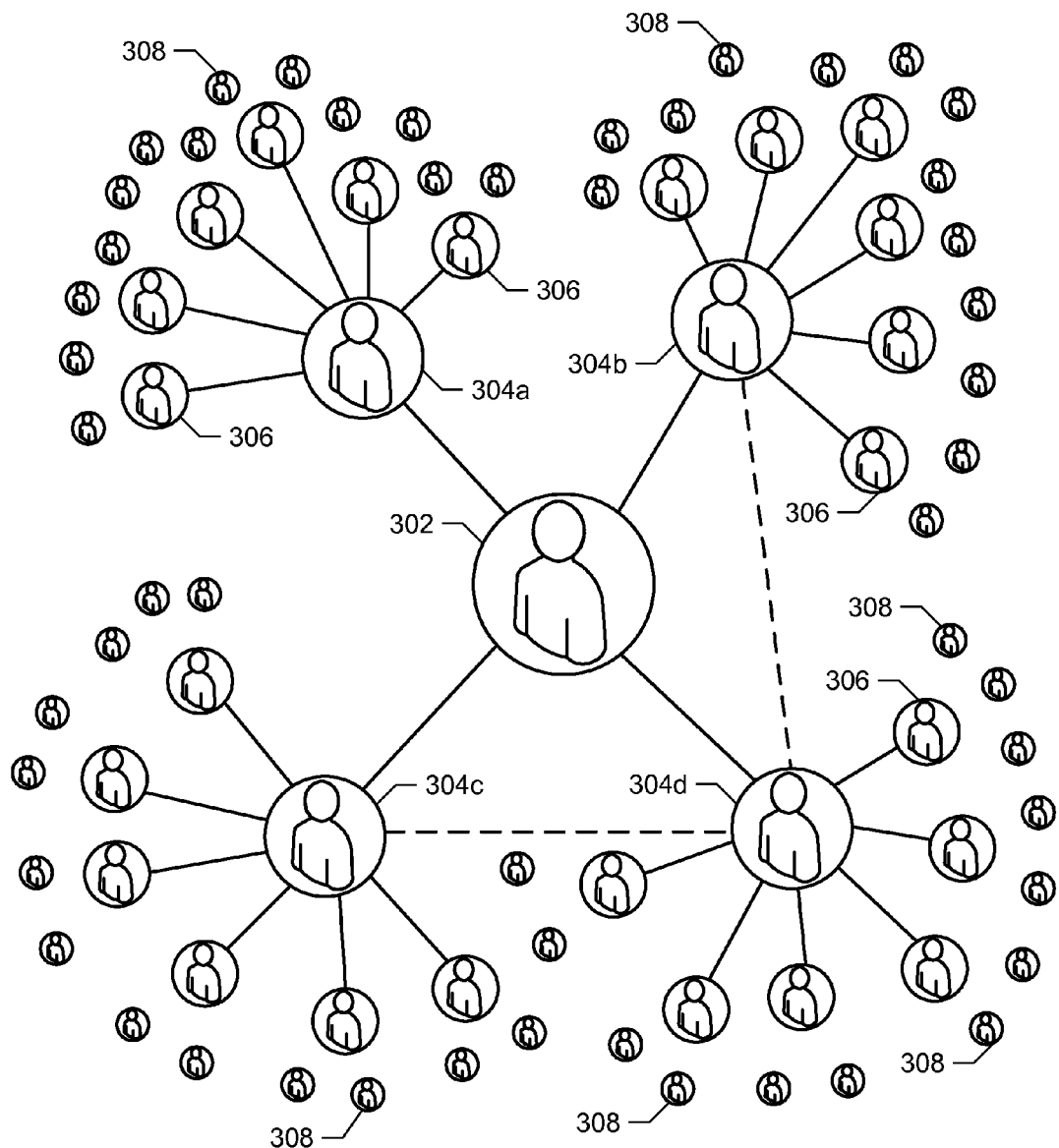
FIG. 3 illustrates an example social network for a user on an online social networking site.

FIG. 3 illustrates an example social network 300 for a user 302 on the social networking site 102 of FIG. 1. The illustrated social network 300 is focused on the particular user 302 and the connections between other users 304, 306, 308 and the user 302. In the example of FIG. 3, first-degree, or direct, connections are labeled with reference numeral 304, second-degree connections (e.g., friend-of-a-friend) are labeled with reference numeral 306, and third-degree connections (e.g., friend-of-a-friend-of-a-friend) are labeled with reference numeral 308. The user 304$d$ is also directly connected to both users 304$b$ and 304$c$ as represented by the dashed lines in FIG. 3. Some connections may be made through multiple channels. For example, if the user 302 was not a direct connection with the user 304$b$, the user 302 would be a second-degree connection to the user 304$b$ through the user 304$d$. In some examples the connectedness monitor 204 ignores the connections between two users other than the closest or shortest connection.

The example connectedness monitor 204 of FIG. 2 may weight the first-degree connections 304$a$-304$d$, the second-degree connections 306, and the third-degree connections 308 differently. For example, a second-degree connection 306 may be considered less of a connection than a first-degree connection 304$a$-304$d$.

For an example person i (e.g., the user 302), Equation 1 shows a number of contacts Mi including both direct and indirect contacts. In Equation 1, Di is the number of direct contacts of the user 302, I2i is the number of second-degree contacts of the user 302, I3i is the number of third-degree contacts of the user 302, and INi is the number of Nth-degree contacts of the user 302.

$$Mi = Di + I2i + I3i + \ldots + INi \qquad \text{Eq. 1}$$

In some examples, the numbers of indirect contacts I2i-INi exclude any persons that are connected to the user 302 through a closer degree of connection. For example, the I2i indirect contacts (e.g., the users 306) may exclude any of the direct contacts (e.g., the users 304a-304d) of the user 302 because, as described above, some contacts 304a-304d, 306, 308 may be connected to the user 302 through multiple paths. Similarly, the I3i indirect contacts may exclude any of the direct contacts 304a-304d and/or the second-degree contacts 306 of the user 302, and so on up to the INi Nth-degree contacts. However, in some examples the indirect contacts I2i-INi may include all contacts that may be reached through the respective numbers of degrees to, for example, increase the connectedness scores of those users who have more interconnected networks of contacts.

The connectedness monitor 204 determines a connectedness Ci based on the direct and indirect contacts of the user 302. The example connectedness monitor 204 assigns different weights to the direct contacts Di and the indirect contacts I2i-INi based on the number of steps between the level (e.g., second-degree, third-degree, etc.) of connection and the user 302. Equation 2 is an example of a connectedness Ci for the user 302, where N is the number of degrees or steps between the user 302 and the Nth-degree contacts.

$$Ci = Di + (I2i/2) + (I3i/3) + \ldots + (INi/N) \qquad \text{Eq. 2}$$

The example connectedness score of Equation 2 may assume that all participants of the network (e.g., the direct contacts Di and the indirect contacts I2i-INi) are given full or substantially full access to the user 302 (e.g., the ability to view and/or contact the user 302) and/or to other users 304a-304d, 306, and 308 of the social networking site 102. However, some social networking sites allow the users 302-308 to control the access given to the other users 302-308 on the social networking site 102. In some examples, users 304-308 that have restricted connections with the user 302 are removed from the corresponding contact count Di, I2i, I3i, or INi. However, in some examples the users 304-308 that have restricted connections with the user 302 are not removed but instead are weighted lower than users 304-308 that have full connections with the user 302. For example, Equation 3 illustrates a connectedness $Ci_{remove}$ where the users 304-308 who have a restricted connection with the user 302 are removed, and Equation 4 illustrates a connectedness $Ci_{weight}$ having some restricted connections DRi, I2Ri, I3Ri, and INRi have a reduced weight relative to respective ones of the unrestricted connection counts DUi, IU2i, IU3i, and IUNi. In some examples, the connectedness monitor 204 establishes an upper limit on the number of degrees N to be counted, where all connections more than N steps are ignored. In some other examples, the connectedness monitor 204 does not limit the upper value of N.

$$Ci_{remove} = \{Di + (I2i/2) + (I3i/3) + \ldots + (INi/N)\} - \qquad \text{Eq. 3}$$
$$\{DRi + (I2i/2) + (I3i/3) + \ldots + (INi/N)\}$$

$$Ci_{weight} = \{DUi + (IU2i/2) + (IU3i/3) + \ldots + (IUNi/N)\} + \qquad \text{Eq. 4}$$
$$0.001 * \{DRi + (IR2i/2) + (IR3i/3) + \ldots + (IRNi/N)\}$$

In some examples, the weight factor (e.g., 0.001 in Equation 4) applied to the restricted connections DRi, IR2i, IR3i, and IRNi may be based on the activities or interactions in which the user 302 engages and the notifications that the user 302 or the user 304, 306, or 308 has chosen to restrict. Example interactions that may be blocked include, but are not limited to, posting to a wall (e.g., a public or semi-public posting board belonging to a user to which anyone with the proper permissions may write or post); sending private messages; chatting; viewing or posting images, videos, and/or other media; commenting on a user's status; viewing the friends of a user; notifications of user status updates; and posting the results of an application (e.g., event invitations, game scores, etc.). In some examples, activities in which the user 302 engages longer or more often are weighted higher than activities in which the user 302 engages less often when such activities are restricted between the user 302 and other users 304-308, and connections that are completely restricted may be weighted highest (i.e., to reduce the amount the connection counts toward the connection score the most of any weight). Thus, the example equations 2-4 may be modified to apply multiple weights according to different restriction combinations.

Many of the interactions may be restricted either by the originating (performing, initiating) user 302 or by the receiving user 304, 306, or 308. Thus, DRi may be the sum of those users 304a-304d to whom the user 302 has restricted viewing the user's 302 activities, those users 304-308 whose activities the user 302 has chosen not to view, those users 304-308 who have blocked the user 302 from viewing their activities, those users 304-308 who have chosen to view less of the user's 302 activities, and/or any other blocking or ignoring options.

After determining a connectedness (e.g., $Ci_{weight}$ or $Ci_{remove}$), the example connectedness monitor 204 may make the connectedness of the users 302-308 more comparable by generating a connectedness score (e.g., assigning the user 302 a percentile rank). Equation 5 illustrates an example percentile formula that may be used to determine the percentile rank of a user 302 with respect to his or her connectedness for use as a connectedness score. In Equation 5, X is the number of users 302-308 whose connectedness are less than Ci (e.g., $Ci_{weight}$ or $Ci_{remove}$), Y is the total number of unique users in the social networking site 102, and P(Ci) is the percentile of the connectedness Ci. The example connectedness Ci and the connectedness score (e.g., percentile P(Ci)) may be updated regularly or irregularly because the connections in a social networking site change frequently.

$$P(Ci) = (X/Y) * 100 \qquad \text{Eq. 5}$$

Returning to FIG. 2, after determining the connectedness and/or the connectedness score(s) of one or more users, the connectedness monitor 204 provides the information to the user ranker 208 and/or to the database 118. The connectedness monitor 204 may further determine network constancy score(s) for one or more users. As described above, a network constancy score represents the degree to which removing a user from the social networking site 102 may reduce the connectedness of the remaining users on the social networking site 102.

In general, the interactivity monitor 206 determines an interactivity and/or an interactivity score for one or more users of the social networking site 102. The interactivity monitor 206 may determine the interactivity of a user by determining (e.g., counting) a number of interactions between the user and other users on the social networking site 102. The interactivity monitor 206 may further convert the interactivity into an interactivity score by, for example, comparing the interactivities of the users of the social networking site 102. Example determinations of an interactivity score are described in more detail below. However, such examples are merely illustrative and may be modified based on any one or more of the format, the configuration, the purpose, the features, the user population, and/or any other traits of a particular social networking site, and/or based on the type of interactions being measured on the social networking site.

Figure 4:
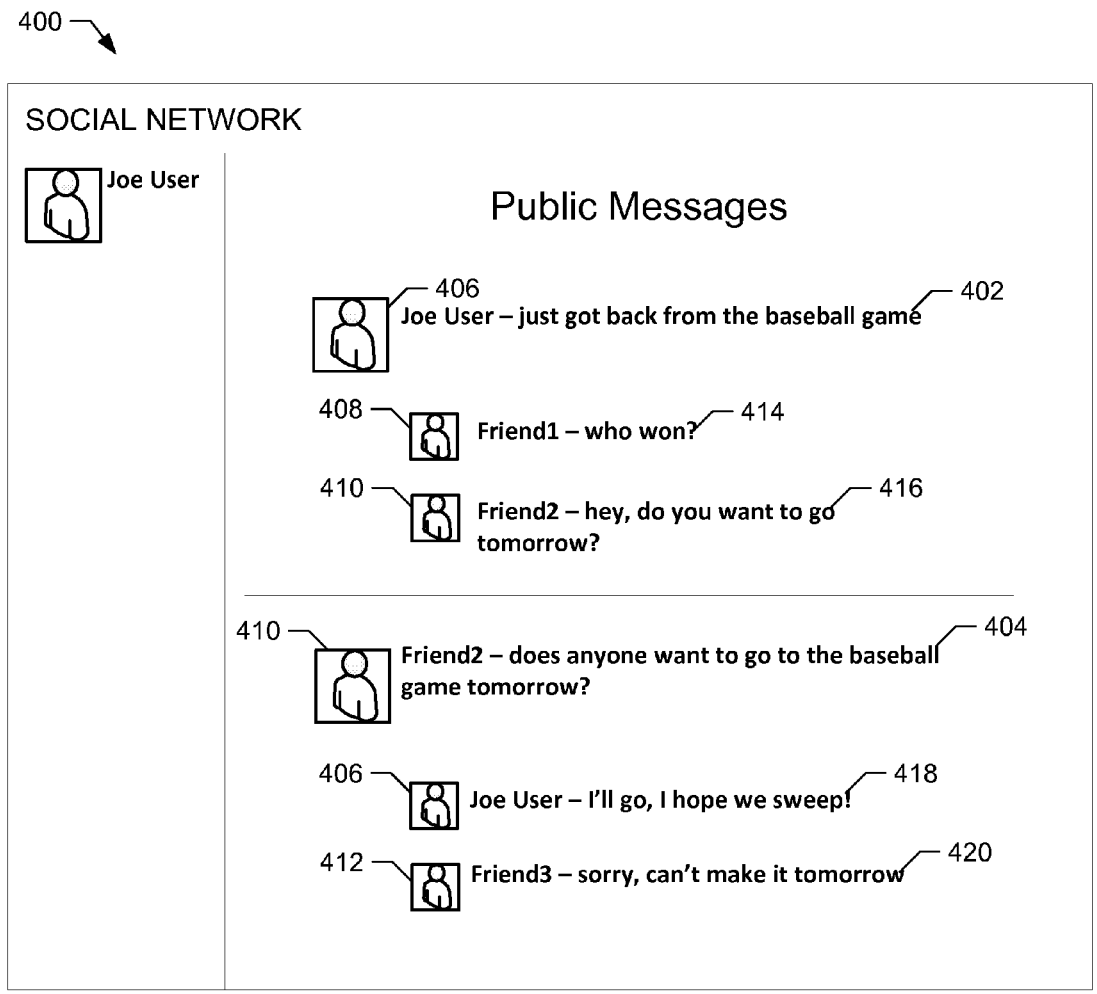
FIG. 4 illustrates an example social networking webpage including interactions between users and responses to the interactions.

FIG. 4 illustrates an example social networking webpage 400 including interactions 402 and 404 between example users 406, 408, 410, and 412 and response interactions 414, 416, 418, and 420 to the interactions 402 and 404. The example interaction 402 represents, for example, a status update by the user 406, in which the user 406 posts a message intended to be viewed by any users who are directly connected (e.g., first-degree contacts) and/or indirectly connected (e.g., second-degree contacts, etc.) to the user 406. Similar interactions may include posting results from an application (e.g., an online game), updating profile information, posting a link to another website, and/or posting media (e.g., music, video, etc).

On some social networking sites, the connections (e.g., the users 408 and 410) of the user 406 who posts the status update interaction 402 may respond to the interaction with their own respective response interactions 414 and 416. The responses 414 and 416 may be directed to the user 406, the direct connections of the user 406, any users 408 and 410 who have responded to the interaction 402 to which the response 414 is directed, and/or any other users 406-412 who may be updated with the status of the user 406. On some social networking sites, the ability to notify and update users 408-412 with the status (or other posting) of the user 406 is practically unlimited. For example, the user 406 may make his or her profile available to any user 408-412 of the social networking site 102 (FIG. 1) who wants to subscribe to or follow the user 406 and/or even to any member of the public having access to the wide area network 106 of FIG. 1.

Figure 5A:
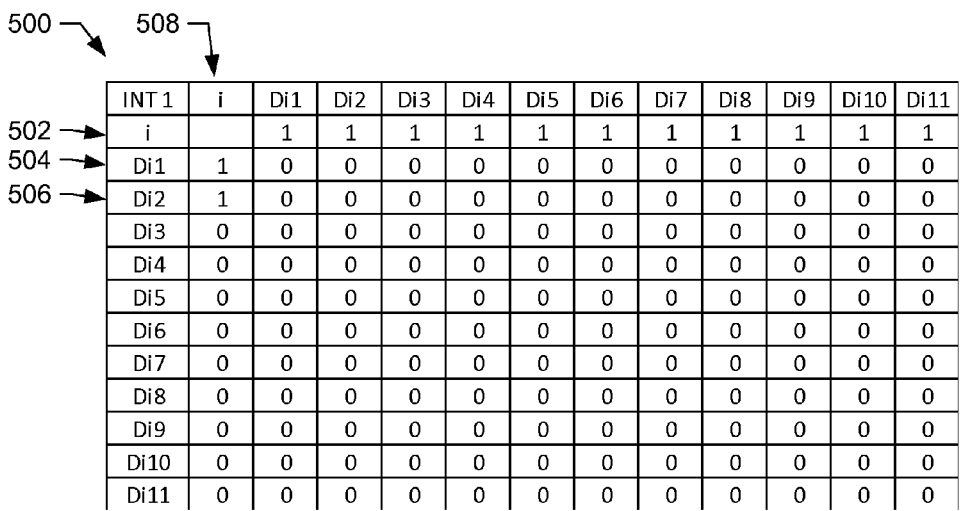
FIG. 5A illustrates an example relational matrix representative of the interactions of FIG. 4.

FIG. 5A illustrates an example relational matrix 500 representative of the interactions 402, 414, and 416 of FIG. 4. As described above, a relational matrix (or a vector or other data structure) is generated and/or updated for each interaction 402, 404, 414-420 and/or set of interactions (e.g., the set of interactions 402, 414, and 416, and the set of interactions 404, 418, and 420). In the relational matrix 500, the user 406 is represented as i and has $D_i$x direct contacts. The example user i 406 of FIG. 5A has 11 direct contacts and, therefore, the relational matrix 500 includes contacts $D_i1$-$D_i11$.

The columns in the matrix 500 represent the users 406-412 at whom an interaction 402, 404, or 414-420 is directed, while the rows in the matrix 500 are the users 406-12 who generate or perform responsive interaction(s) 402, 404, or 414-420. A first row 502 of the matrix 500 represents the interactions performed by the user i 406, including the initial interaction 402 performed by the user i 406. The user 406 (e.g., user i) posts the interaction 402 (e.g., a status update) for each of his or her contacts $D_i1$-$D_i11$, causing the example interactivity monitor 206 (FIG. 2) to enter 1 interaction count into each column in the row 502 corresponding to the contacts $D_i1$-$D_i11$, for a total of 11 interaction counts for the interaction 402. The example contacts $D_i1$ and $D_i2$ each post a response (e.g., interactions 414 and 416) to the status update interaction 402 as illustrated in respective rows 504 and 506. Thus, the interactivity monitor 206 enters 1 interaction count into the i column 508 in the rows 504 and 506.

Because the response interactions 414 and 416 may occur some time after the interaction 402, the interactivity monitor 206 may store the relational matrix 500 into a database (e.g., the database 118 of FIG. 1) and retrieve the relational matrix 500 at a later time for updating. While in the illustrated example the interactivity monitor 206 only enters interaction counts into the i column 508, the interactivity monitor 206 may additionally or alternatively enter interaction counts into one or more of the $D_i1$-$D_i11$ columns to represent interactions by $D_i1$ and/or $D_i2$ with other contacts $D_i1$-$D_i11$ of the user i 406. For example, on some social networking sites any user 406-412 who performs a response interaction 414 to the initial interaction 402 is notified of later response interactions 416 from other users 406-412 to the same initial interaction 402. Additionally or alternatively, some social networking sites notify a user 406 when a direct contact (e.g., the user 408) performs an initial and/or response interaction 402, 404, or 414-420 to a mutual direct contact (e.g., the user 410). The example interactivity monitor 206 may therefore update the relational matrix 500 in accordance with the particular notification and/or interaction tools and/or mechanisms of a particular social networking site. In some examples, the interactivity monitor 206 also enters an interaction count into the Di1 column of the Di2 row 506 to indicate that Di1 (e.g., Friend 1 408 of FIG. 4) is also notified because she previously generated the response interaction 414 and is notified about further response interactions (e.g., 416).

Figure 5B:
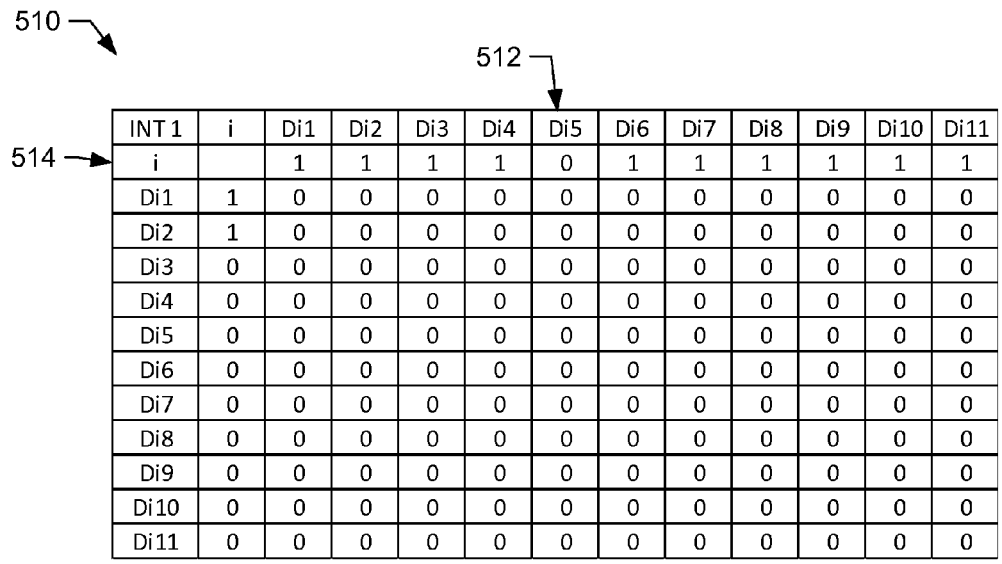
FIG. 5B illustrates another example relational matrix representative of the interaction of FIG. 4 where a friend of the user has restricted a connection with the user.

FIG. 5B illustrates another example relational matrix 510 representative of the interaction 402 of FIG. 4 where a direct contact $D_i5$ of the user 406 has restricted or blocked status update interactions from the user 406. Some social networking sites provide their respective users 406-412 options to block notifications about one or more of their direct and/or indirect contacts. For example, a user 412 may choose not to be notified when the user 406 performs one or more of: posting to a wall; sending private messages; chatting; viewing or posting images, videos, and/or other media; commenting on a user's status; viewing the friends of a user; notifications of user status updates; posting the results of an application (e.g., event invitations, game scores, etc.); and/or any other interaction(s) with the social networking site 102. The example relational matrix 510 of FIG. 5B is representative of the example interaction 402 and the response interactions 414 and 416 of FIG. 4, except that the direct contact $D_i5$ of the user 406 has chosen to ignore or block one or more types of status updates from the user 406, of which the interaction 402 is one type. The example interactivity monitor 206 of FIG. 2 may determine notification settings of the direct contacts $D_i1$-$D_i11$ of the user 406 and determine, based on the notification settings, that the contact $D_i5$ has disabled notifications for status updates (e.g., restricted, ignored, blocked, etc.). Thus, when the user i 406 generates the interaction 402 directed at the contacts $D_i1$-$D_i11$, the interactivity monitor 206 determines that there is no interaction between the user i 406 and the contact $D_i5$, and therefore does not enter an interaction count in a column 512 corresponding to the contact $D_i5$ and a row 514 corresponding to the interaction 402.

Figure 6:
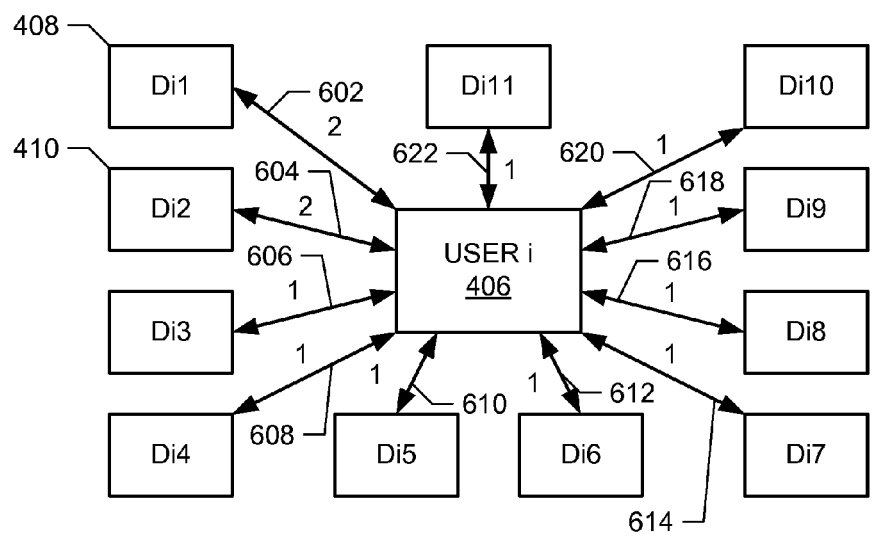
FIG. 6 illustrates example vectors representative of the interactions of FIG. 4.

FIG. 6 illustrates example vectors 602-622 representative of the interactions 402, 414, and 416 of FIG. 4. The example vectors 602-622 may be used as an alternative to the example relational matrix 500 illustrated in FIG. 5A to store the interaction counts of FIG. 4. In the example of FIG. 6, the interactivity monitor 206 generates a vector 602-622 for each connection between the user i 406 and the participants $D_i1$-$D_i11$ in the interaction 402. Each of the vectors 602-622 has a weight that is representative of the number of interaction counts between the user i 406 and the corresponding user $D_i1$-$D_i11$. For example, the vector 602 that includes the user i 406 and the user $D_i1$ (e.g., Friend 1 408) has a weight of 2 because the interaction 402 and the response interaction 414 include the users 406 and 408. In contrast, the weight of the example vector 606 is 1 because only the interaction 402 includes the user i 406 and the user $D_i3$. Additionally or alternatively, the vectors 602 and 604, or the vectors 602-622, may be bidirectional vectors that include the interaction counts in a first direction from the user i 406 to the respective users 408 and 410 and in a second direction from the respective users 408 and 410 to the user i 406.

Figures 7, 8:
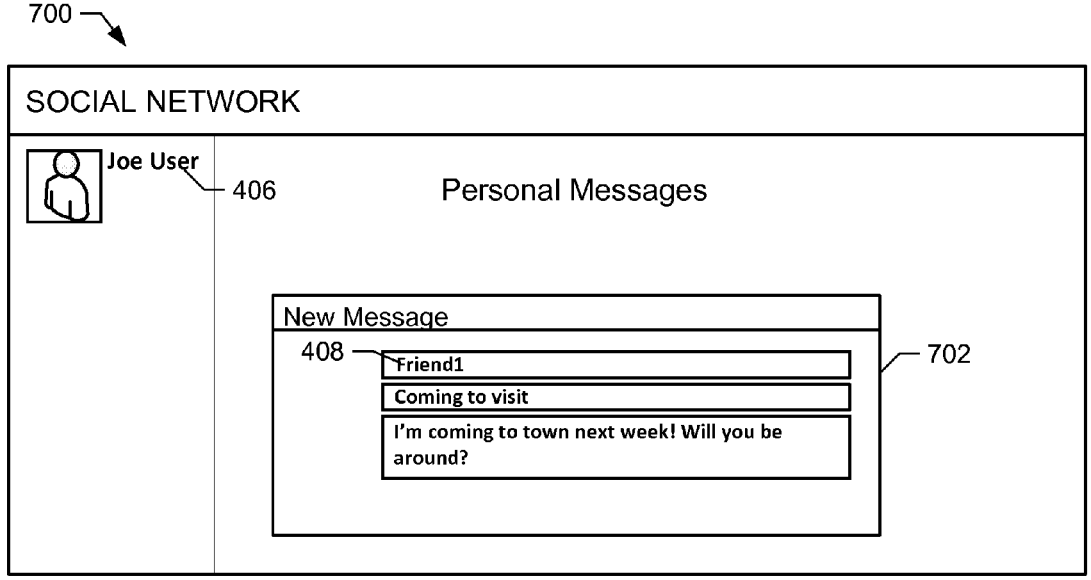
FIG. 7 illustrates an example social networking webpage including a personal message sent from one user to another user.
FIG. 8 illustrates an example relational matrix representative of the interaction of FIG. 7.

FIG. 7 illustrates an example social networking webpage 700 including a personal message interaction 702 sent from a user 406 to another user 408. On the example social networking site 102 of FIG. 1, the user 406 may interact with one or more other users 408-412 by transmitting a message directly to the other user(s) 408-412. The receiving user(s) 408-412 may access the message by, for example, navigating to the social networking site 102 via a web browser to view the message. The example message interaction 702 is directed from the user 406 to the user 408 and to no other users.

FIG. 8 illustrates an example relational matrix 800 representative of the message interaction 702 of FIG. 7. While the example relational matrix 800 includes all of the contacts $D_i1$-$D_i11$ of the user i 406, the interactivity monitor 206 determines that the interaction 702 only took place between the users 406 and 408. In some examples, however, the relational matrix 700 only includes those contacts $D_i1$-$D_i11$ who are included in the initial transaction. Thus, the interactivity monitor 206 adds an interaction count to the appropriate column 802 and row 804. If the user 408 does not respond to the interaction 702 (e.g., by sending a reply message), the example matrix 800 may be considered complete, and another relational matrix is created for a later interaction.

Figures 9, 10:
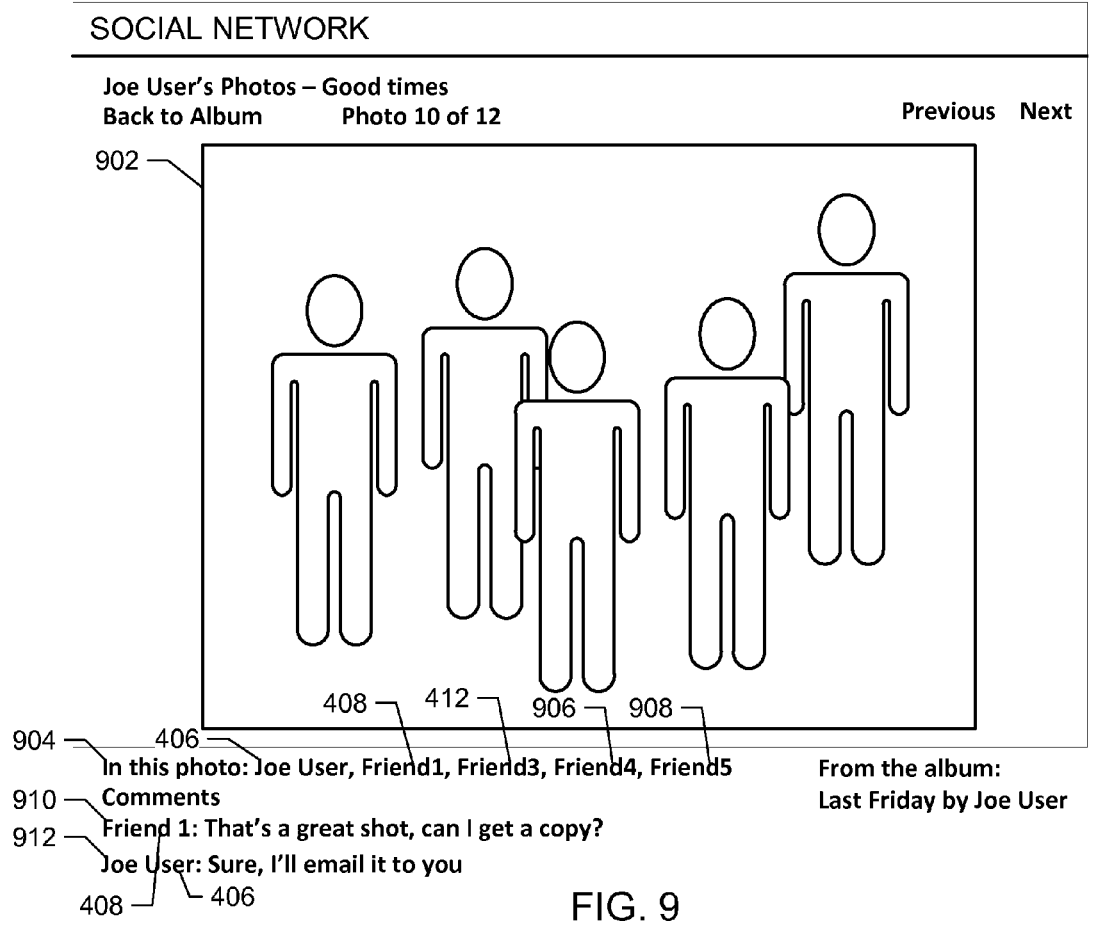
FIG. 9 illustrates an example social networking webpage including an image and an interaction between users associated with the image.
FIG. 10 illustrates an example relational matrix representative of the interaction of FIG. 9.

FIG. 9 illustrates an example social networking webpage 900 including an image 902 and an interaction 904 between users 406-412 associated with the image 902. The example image 902 may be posted by, for example, the user 406, who further "tags" the picture with identifications of other users 408, 412, 906, and 908 who are also present in the image 902. On some social networking sites (e.g., the social networking site 102 of FIG. 1), users 406-412, 906, and 908 may post comments 910 and 912 about the image 902 for others to view when they view the image 902. In the illustrated example, the users 406 and 408 have left respective comments 912 and 910 about the image 902.

FIG. 10 illustrates an example relational matrix 1000 representative of the interaction of FIG. 9. The example relational matrix 1000 includes the user i 406 and the contacts $D_i1$-$D_i11$ of the user 406. The interactivity monitor 206 (FIG. 2) determines that the user i 406 posted the image 902 and tagged the respective users 408, 412, 906, and 908 who are in the image 902. In response, the interactivity monitor 206 enters interaction counts into a row 1002 corresponding to interactions by the user i 406 directed at other users 408-412, 906, and 908 within columns corresponding to the receiving users of the interaction (e.g., the posting and/or tagging of the image 902).

The example interactivity monitor 206 further detects the comments 910 and 912 and adds additional interactivity counts to a row 1004 corresponding to the user $D_i1$ (e.g., Friend1 408) who generated the response interaction 910, and to the row 1002 corresponding to the user i 406 who generated the response interaction 912. In the illustrated example, the interactivity monitor 206 only generates an interaction count for a response interaction 912 in a column 1006 corresponding to the user $D_i1$ 408 who generated the previous response interaction 910. However, the interactivity monitor 206 may generate interaction counts in any row and/or column based on the particular configuration and/or settings of the social networking site (e.g., the social networking site 102). In general, each social networking site may choose to notify users of interactions and/or activities by other users that may potentially be of interest to them in different ways. Thus, the interactivity monitor 206 may generate interaction counts based on the particular notification settings and/or configurations of the social networking site 102 and/or the users 406-412, 906, and 908.

In some examples, the relational matrices 500, 510, 800, and 1000 are used by the interactivity monitor 206 to determine an interactivity of the user i 406. The interactivity for the example user i 406 may be determined by summing the interaction counts in the relational matrices corresponding to the user i 406 over a specified time period or over all time. In these examples, the interactivity monitor 206 generates similar relational matrices for the users $D_i1$-$D_i11$ to represent the respective interaction counts for use in determining the respective interactivities of the users $D_i1$-$D_i11$. In some examples, however, the interactivity monitor 206 uses the relational matrices 500, 510, 800, and 1000 to determine the interactivities for any of the users $D_i1$-$D_i11$. While these examples may result in fewer relational matrices or other data structures to be stored, the interactivity monitor 206 may have to search through a larger number of relational matrices to determine the interactivity of the user i 406.

An interactivity score of the user i 406 may be determined by, for example, comparing the interactivity of the user i 406 to the interactivities of other users on the social networking site. For example, the interactivities may be normalized based on an upper interactivity, a lower interactivity, a median interactivity, and/or another normalization factor. Additionally or alternatively, the interactivity score may be determined based on a percentile rank of the interactivity of the user i 406.

Additionally or alternatively, any of the relational matrices 500, 510, 800, or 1000 may be represented as a vector or in another data structure format. For example, the relational matrix 500 may be represented according to the following vector: <i; $D_i1,1,1$; $D_{i2},1,1$; $D_i3,1,0$; $D_i4,1,0$; $D_i5,1,0$; $D_i6,1,0$; $D_i7,1,0$; $D_i8,1,0$; $D_i9,1,0$; $D_i10,1,0$; $D_i11,1,0$>. Thus, the example vector identifies the user i 406, the users $D_i1$-$D_i11$, and the interaction counts directed at each of the users $D_i1$-$D_i11$ by the user i 406 and the interaction counts directed at the user i 406 by each of the users $D_i1$-$D_i11$. Of course, other vector formats may be used instead of the example vector or the relational matrices 500, 510, 800, or 1000.

Returning to FIG. 2, after the interactivity monitor 206 determines the interactivities and/or the interactivity scores for the users, the interactivity monitor 206 provides the interactivities and/or the interactivity scores to the user ranker 208 and/or to the database 118. In some examples, the interactivity monitor 206 regularly processes interactions (e.g., batch processing) between users of the social networking site 102 and stores the resulting generated and/or updated relational matrices and/or vectors in the database 118. To this end, a data collection monitor 214 determines whether data collection should occur and controls the interactivity monitor 206 accordingly. Additionally or alternatively, the data collection monitor 214 may control the connectedness monitor 204 to collect and/or process the connectedness of the users of the social networking site 102 at regular and/or irregular intervals.

The user ranker 208 of FIG. 2 receives the connectedness and/or the connectedness scores from the connectedness monitor 204 and/or the interactivities and/or the interactivity scores from the interactivity monitor 206. Based on the received information, the user ranker 208 determines user rank(s) 212 for one or more users of the social networking site 102 (e.g., based on the user request query 210). The user rank(s) may then be output to the location from which the user request query 210 was received (e.g., the monitor terminal 116 of FIG. 1) and/or to a different location (e.g., a storage device, a central data facility, an advertiser, database 118).

The user ranker 208 may generate user rank(s) by, for example, weighting the interactivity score and the connectedness score and then combining the weighted scores to generate an overall (e.g., composite) rank. The weight(s) applied to the connectedness score and/or the interactivity score may be equal or different based on, for example, the user request query 210. For example, if an advertiser believes that its products are more likely to sell by simply informing users of its products, the user ranker 208 may weight the connectedness score of the users more heavily than the interactivity scores.

The example social networking monitor 112 further includes a network constancy determiner 216 to determine a network constancy score for one or more users in the social networking site 102. The network constancy score for a user is representative of a number of connections that would be broken, and/or increased in degree by more than a threshold number of degrees, if the user was removed from the social networking site. The network constancy score may be used by, for example, an advertiser or marketer to determine the efficacy of a particular social networking site. For example, if a social networking site has users having low networking constancy scores relative to other social networking sites, the social networking site may be considered less stable because removing users from the social networking site may also remove larger numbers of connections, thereby decreasing the connectedness of the users on the social networking site. Less stable social networking sites are likely less desirable places to purchase advertisements and/or longer running advertising campaigns.

To determine a network constancy score, the connectedness monitor 204 determines the connections between the user (e.g., the user 302 of FIG. 3) and the other users 304-308 to which the user is connected. The network constancy determiner 214 then evaluates the connections between the users 304-308 to determine which of the users 304-308 would, if the user 302 was removed from the social networking site 102, be disconnected from each other, be connected to each other at a higher degree of separation, and/or continue to be connected to each other.

The network constancy score may be, for example, a proportion of the users 304-308 who would remain connected within a degree threshold when the user 302 is removed from the social networking site 302. In some examples, the network constancy score may be weighted according to the degree of the connections that are dropped. For example, a second-degree connection that is broken may be weighted higher (and therefore affect the network constancy score more) than a fifth-degree connection that is broken.

In an example, the network constancy determiner 214 may determine a network constancy score for the user 302 of FIG. 3. By removing the user 302 from the network, the user 304a is disconnected from the users 304b-304d. However, the users 304b-304d remain connected. Thus, three second-degree connections (e.g., the users 302a and 302b, 302a and 302c, and 302a and 302d) are broken while two first-degree connections (302b and 302d, and 302c and 302d) and a second-degree connection (302b and 302c) remain unbroken. Using the ratio of broken connections up to second-degree connections as the example network constancy score, the network constancy score for the user 302 is 0.5. However, the network constancy score may use a higher degree of connection and/or a ratio of different factors (e.g., users connected or disconnected).

The example social networking monitor 112 further includes a network efficacy determiner 218 to determine a network efficacy score 220. The example network efficacy determiner 218 determines a network efficacy of the social networking site 102 based on an average user connectedness of the users of the social networking site 102, the average interactivity of the users of the social networking site 102, and/or the network constancy scores for the users of the social networking site 102. An example determination of network efficacy E is shown in Equation 6 below, where C is the average connectedness of the users, I is the average interactivity of the users, and X is the average network constancy of the users of the social networking site 102 for which the a network efficacy score.

$$E = C + I - X \qquad \text{Eq. 6}$$

The network efficacy determiner 218 may generate the network efficacy score(s) 220 for one or more social networking sites 102 (or other types of interaction web sites and/or services such as online messaging) in response to, for example, a request from an advertiser. An advertiser may be interested in comparing, for example, the network efficacies for multiple social networking sites in which the advertiser may be interested in advertising. Additionally or alternatively, the network efficacy determiner 218 may determine network efficacy score(s) 220 at periodic and/or aperiodic intervals to monitor the network efficacy score(s) 220 of social networking sites over time.

FIGS. 11-17 depict example flow diagrams representative of processes that may be implemented using, for example, computer readable instructions that may be used to implement the example user selector 202, the example connectedness monitor 204, the example interactivity monitor 206, the example user ranker 208, the example data collection monitor 214, the example network efficacy determiner 218, and/or, more generally, the example social networking monitor 112 of FIG. 2. The example instructions 1100, 1200, 1300, 1400, 1500, 1600, 1700 of FIGS. 11-17 may be performed using a processor, a controller and/or any other suitable processing device. For example, the example instructions 1100-1700 of FIGS. 11-17 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example instructions 1100-1700 of FIGS. 11-17 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example instructions 1100-1700 of FIGS. 11-17 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example instructions 1100-1700 of FIGS. 11-17 may be implemented manually or as any combination(s) of any of the foregoing techniques, for example, any combination of firmware, software, discrete logic and/or hardware. Further, although the example instructions 1100-1700 of FIGS. 11-17 are described with reference to the flow diagrams of FIGS. 11-17, other methods of implementing the instructions 1100-1700 of FIGS. 11-17 may be employed. For example, the order of execution of the blocks may be changed, and/or some of the blocks described may be changed, eliminated, sub-divided, or combined. Additionally, any or all of the example instructions 1100-1700 of FIGS. 11-17 may be performed sequentially and/or in parallel by, for example, separate processing threads, processors, devices, discrete logic, circuits, etc.

Figure 11:
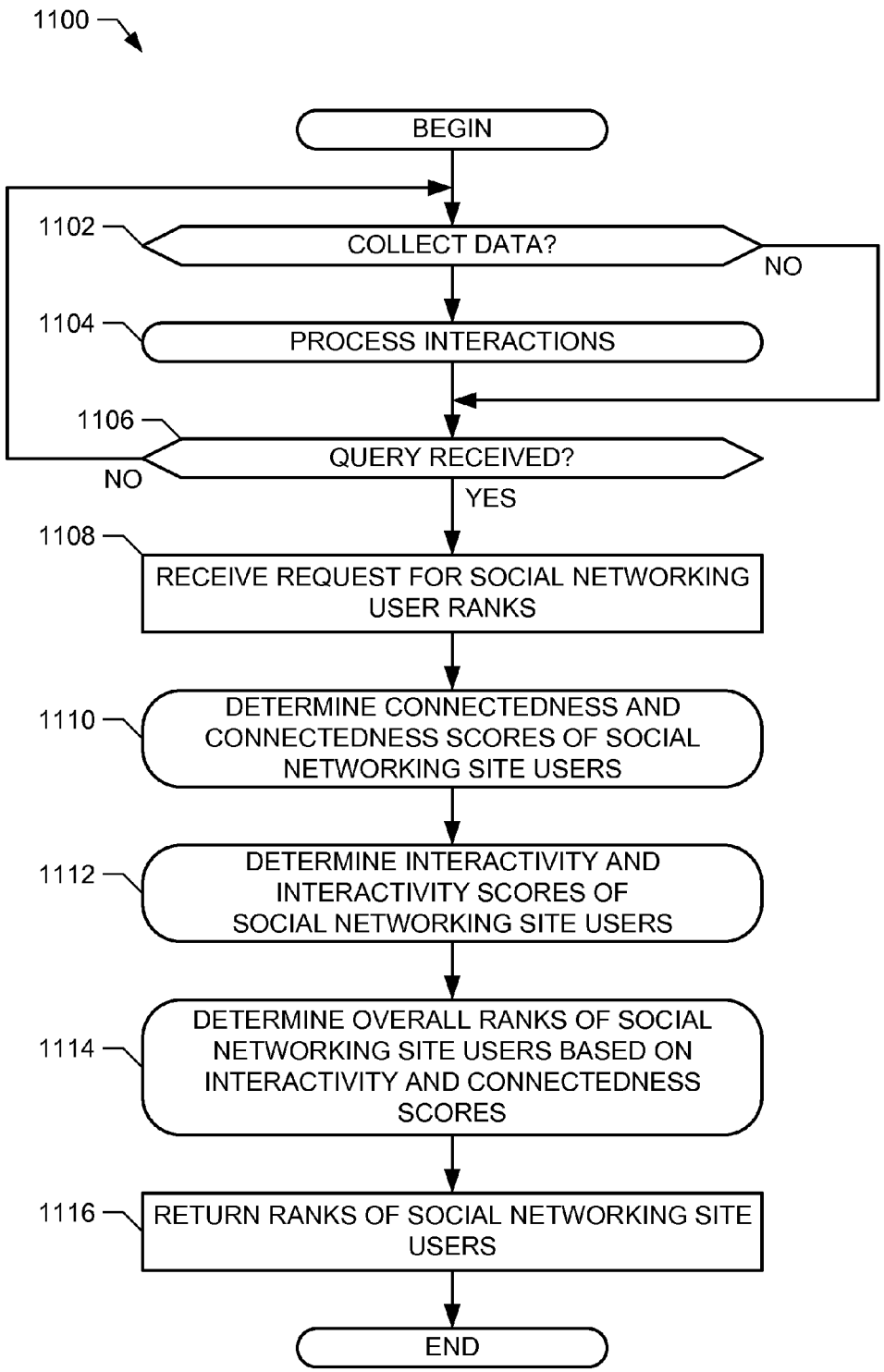
FIG. 11 is a flowchart representative of example machine readable instructions which may be executed to identify popular participants in an online social network.

FIG. 11 is a flowchart representative of example machine readable instructions 1100 which may be executed to identify popular participants in an online social network (e.g., the social networking site 102 of FIG. 1). The example machine readable instructions 1100 may be executed by the social network monitor 112 of FIG. 2.

The example instructions 1100 begin by determining (e.g., via the data collection monitor 214 of FIG. 2) whether to collect data (e.g., process interactions) (block 1102). For example, the data collection monitor 214 may determine whether a data collection period has lapsed. If the data collection monitor 214 determines that it is time to collect data (block 1102), the example interactivity monitor 206 of FIG. 2 processes interactions on the social networking site 102 (block 1104). Example instructions 1200 to implement block 1104 are described below with reference to FIG. 12. As described above, the data collection monitor 214 may additionally or alternatively cause the connectedness monitor 204 to process the connectedness of one or more users of the social networking site 102. After processing the interactions (block 1104), or if it is not time to collect data (block 1102), the user selector 202 of FIG. 2 determines whether a query has been received (block 1106). If a query has not been received, control returns to block 1102 to determine whether it is time to collect data.

If a query is received (block 1106), the user selector 202 receives the request, such as a user request query 210 (FIG. 2) for the popularities of one or more users of the social network site 102 (block 1108). The connectedness monitor 204 of FIG. 2 determines one or more connectedness scores for the users based on the user request query 210 (block 1110). Block 1110 may be implemented using example machine readable instructions 1300 described below with reference to FIG. 13. In some examples, the determination of the connectedness scores includes determining the connectedness of the users. The interactivity monitor 206 determines one or more interactivity scores for the users based on the user request query 210 (block 1112). Block 1112 may be implemented using example machine readable instructions 1400 described below with reference to FIG. 14. In some examples, the determination of the interactivity scores includes determining the interactivity of the users.

Based on the connectedness scores and the interactivity scores, the example user ranker 208 of FIG. 2 determines an overall rank for the users (block 1114). Block 1114 may be implemented using example machine readable instructions 1500 described below with reference to FIG. 15. The user ranker 208 then returns the popularities of the users of the social networking site 102 (e.g., to the monitor terminal 116 of FIG. 1, to a computer 108 of a user of the social networking site 102 of FIG. 1, and/or to another requester location) (block 1118). After returning the popularities of the users, the example instructions 1100 may end or iterate to continue processing interactions and/or responding to requests.

Figure 12:
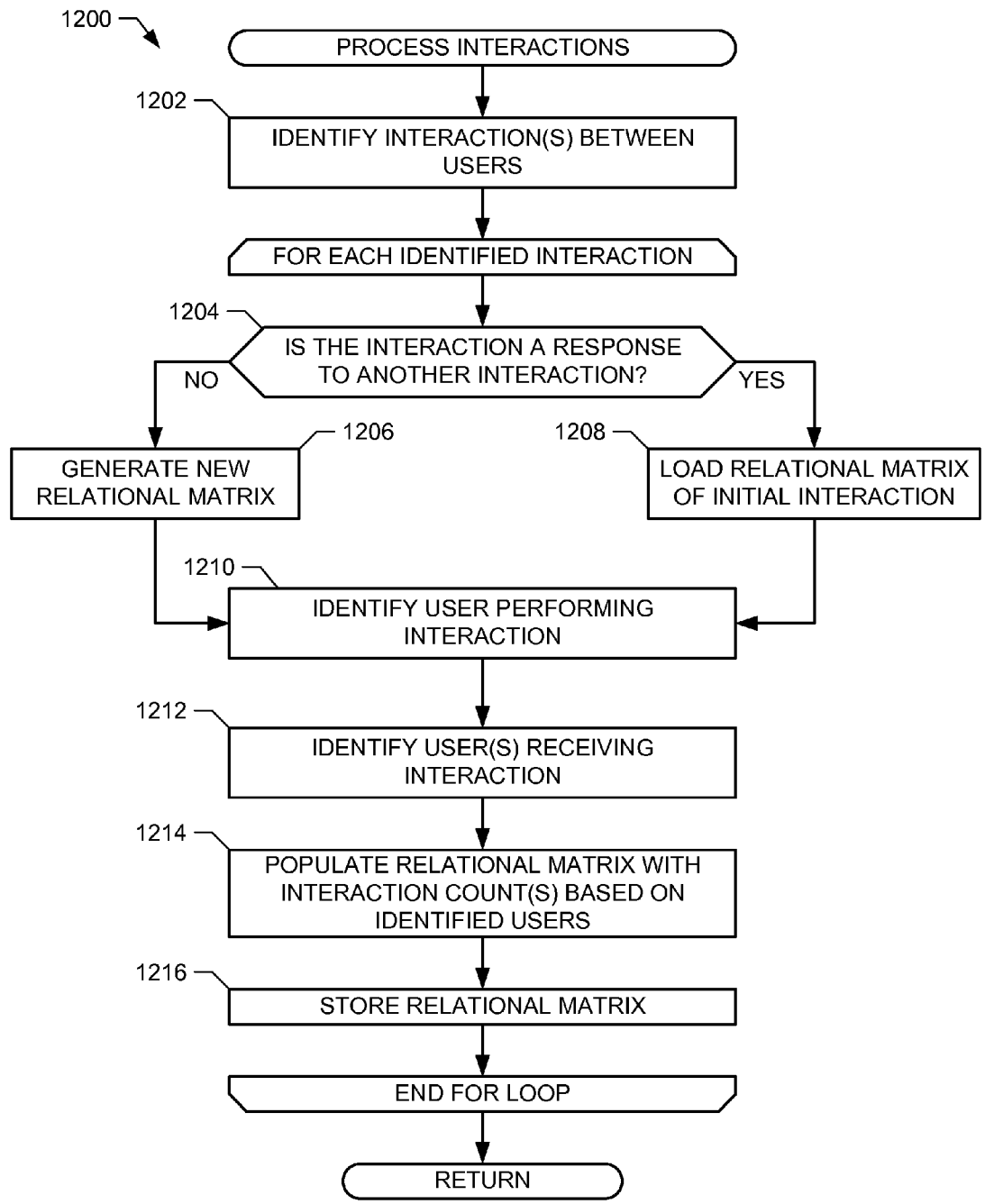
FIG. 12 is a flowchart representative of example machine readable instructions which may be executed to process interactions.

FIG. 12 is a flowchart representative of example machine readable instructions 1200 which may be executed to process interactions. The example instructions 1200 may be executed to implement the example interactivity monitor 206 of FIG. 2 to execute block 1104 of FIG. 11. The instructions 1200 may begin when the data collection monitor 214 determines that it is time to process interactions between users on the social networking site 102.

To process interactions, the example interactivity monitor 206 identifies interactions between users on the social networking site 102 (block 1202). In some examples, the interactivity monitor 206 discards or ignores those interactions that are identified but were previously processed. For example, the interactivity monitor 206 may ignore at least a portion of a relational matrix that is updated with a new or additional interaction after a previous interaction processing sequence. The example blocks 1204-1216 iterate in a for-loop as described below. In particular, the blocks 1204-1216 may be iterated for each interaction identified by the interactivity monitor 206 in block 1202.

For a selected interaction, the interactivity monitor 206 determines whether the action is a response interaction corresponding to a previous initial interaction (block 1204). For example, the interactivity monitor 206 may determine that a status update A by a user is an initial interaction (e.g., is not a response interaction), but may determine that a comment B to the status update A is a response interaction to the earlier status update interaction A. If the selected interaction is not a response interaction (e.g., the interaction is an initial interaction) (block 1204), the example interactivity monitor 206 generates a new relational matrix corresponding to the selected interaction (block 1206). In contrast, if the selected interaction is a response interaction (block 1204), the interactivity monitor loads a previously-created relational matrix corresponding to the initial interaction to which the selected interaction is a response (block 1208).

After generating a new relational matrix (block 1206) or loading a relational matrix (block 1208), the example interactivity monitor 206 identifies a user (e.g., the user i 406 of FIG. 4) that performed the interaction (block 1210). For example, the user that performs a status update is the poster of the update and the person that performs a comment to a status update is the commenter. Thus, the interactivity monitor 206 identifies the poster of a status update or to a user commenting on a status update. The interactivity monitor 206 also identifies user(s) (e.g., the user(s) 408-412 of FIG. 4) receiving the interaction (block 1212). For example, a user receiving the interaction may be a user 408 who is a direct contact of the user i 406 and receives a notification that the user i 406 has updated his or her status.

Based on the identified performing and receiving users, the interactivity monitor 206 populates the relational matrix with interaction count(s) (block 1214). The example interactivity monitor 206 then stores the relational matrix (block 1216). After storing the relational matrix (block 1216), the for-loop may iterate to select another identified interaction or may return control to the example instructions 1100 of FIG. 11. While the example instructions 1200 have been described with reference to a relational matrix, the example instructions may additionally or alternatively be used with a vector or other data structure.

Figure 13:
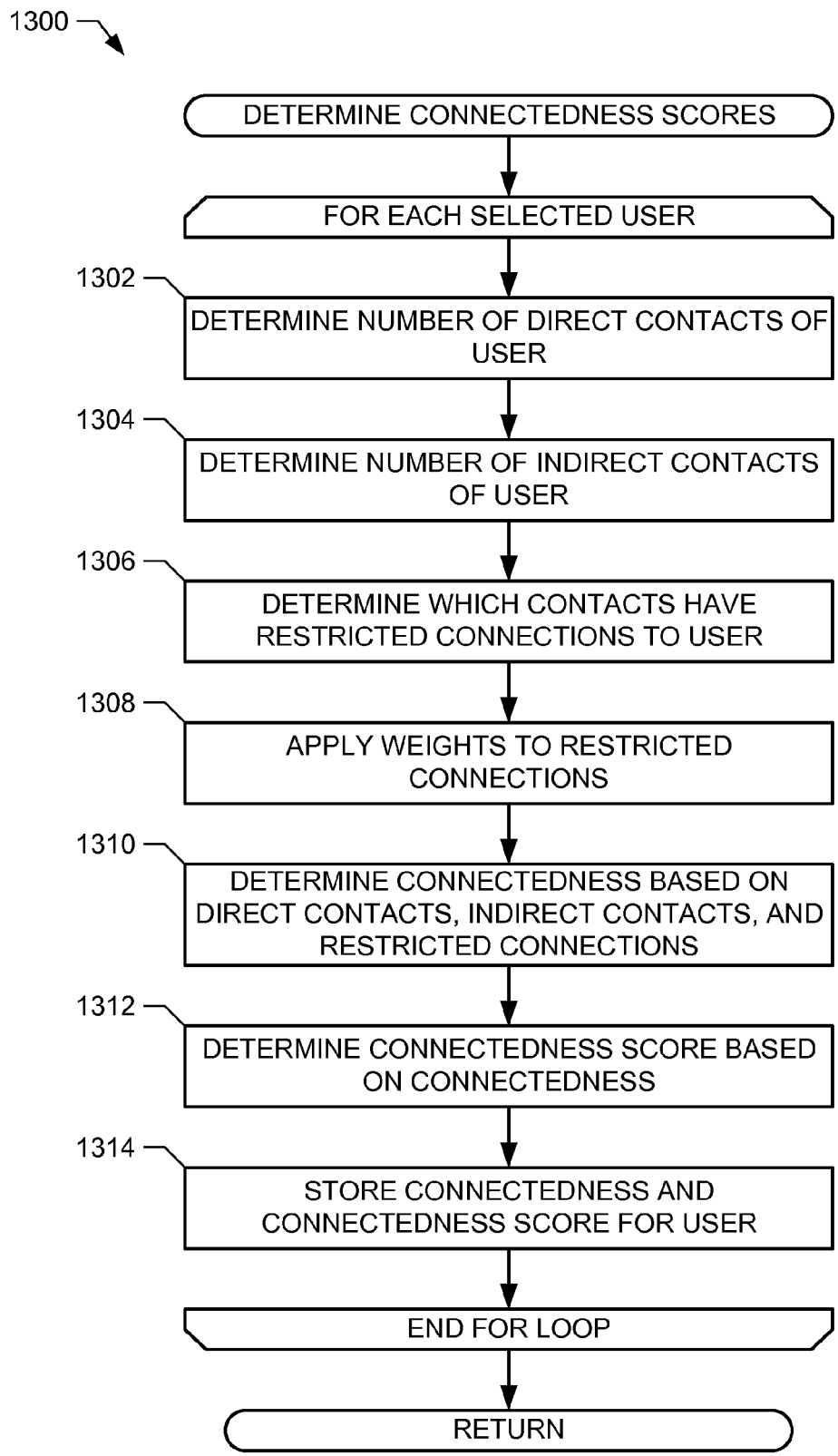
FIG. 13 is a flowchart representative of example machine readable instructions which may be executed to determine connectedness scores of users on a social networking site.

FIG. 13 is a flowchart representative of example machine readable instructions 1300 which may be executed to determine connectedness scores of users on a social networking site (e.g., the social networking site 102 of FIG. 1). The example instructions 1300 may be used to implement the example connectedness monitor 204 of FIG. 2 to execute block 1110 of FIG. 11.

The example instructions 1300 may enter from block 1108 of FIG. 11. The example connectedness monitor 204 iterates blocks 1302-1312 for each user on the example social networking site 102. For a selected user (e.g., the user 302 of FIG. 3), the connectedness monitor 204 determines a number of direct contacts (e.g., the users 304a-304d) of the user 302 (block 1302). The connectedness monitor 204 further determines a number of indirect contacts (e.g., the users 306-308) of the user 302 (block 1304). Additionally, the connectedness monitor 204 determines which contacts 304-308 have restricted connections to the user 302 (block 1306).

The example connectedness monitor 204 then applies weights to the restricted connections (block 1308). The connectedness monitor 204 may apply weights to different numbers of direct 304a-304d and indirect contacts 306-308 based on the restrictions between respective ones of the users 304-308 and the user 302. For example, the connectedness monitor 204 may apply a higher (e.g., larger) weight (or a unit weight) to the user 304b who has an unrestricted connection to the user 302, and may apply a lower (e.g., smaller) weight to the user 304c who has a restricted connection to the user 302. The connectedness monitor 204 determines a connectedness for the selected user 302 based on the unrestricted direct contacts 304a-304b, the unrestricted indirect contacts 306-308, and the restricted direct and/or indirect contacts (block 1310). For example, the connectedness monitor 204 may determine the connectedness $Ci_{weight}$ of the selected user using Equation 4 above.

The example connectedness monitor 204 determines a connectedness score of the selected user 302 based on the connectedness (block 1312). For example, the connectedness monitor 204 may determine the connectedness score based on the connectedness of the selected user 302 compared to the connectedness of other users 304-308 of the social networking site 102. The connectedness monitor 204 may then store the connectedness and the connectedness score for the selected user 302 (e.g., in the database 118 of FIG. 2) (block 1314). After storing the connectedness and the connectedness score, the example instructions 1300 may iterate blocks 1302-1314 for additional users or may return control to block 1112 of FIG. 11.

Figure 14:
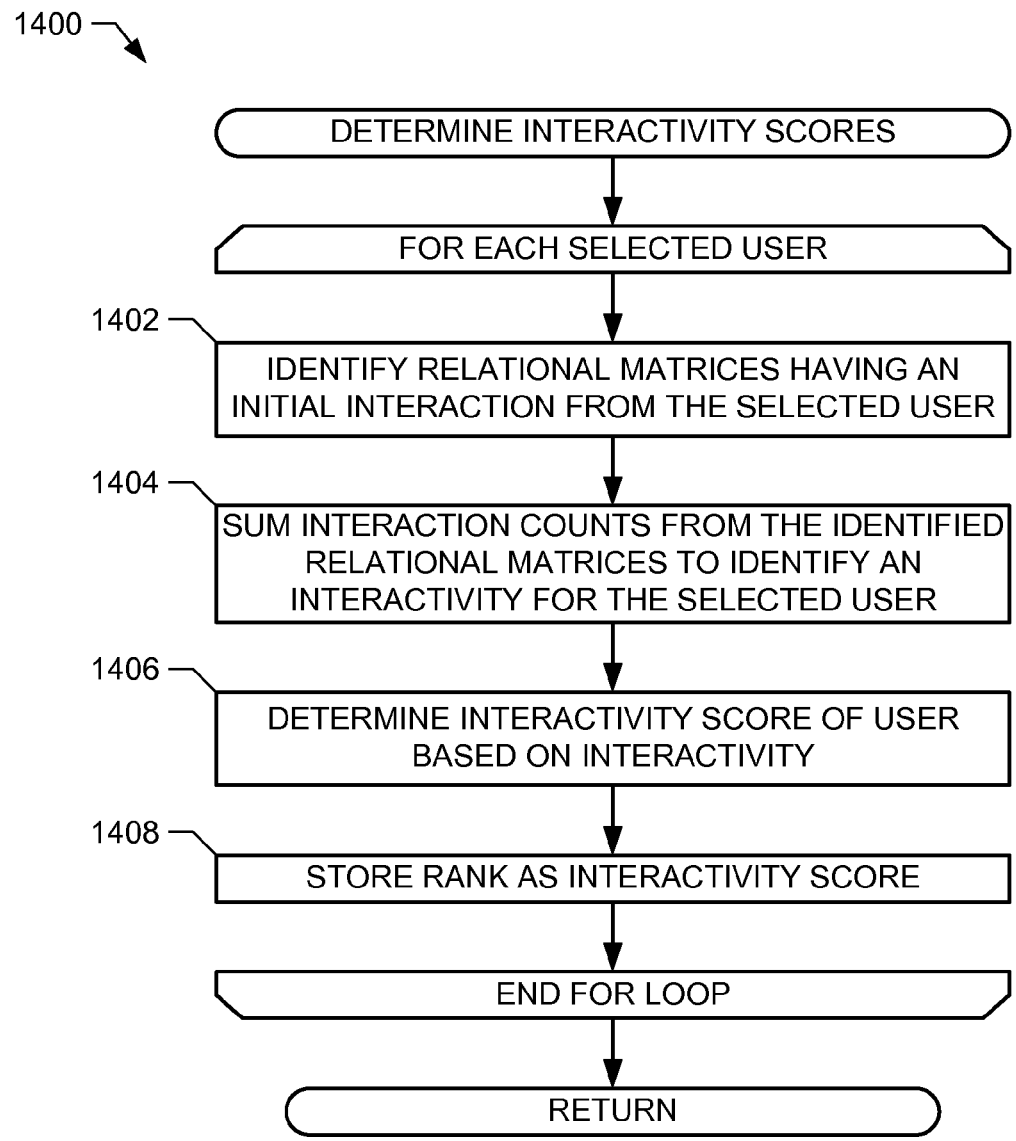
FIG. 14 is a flowchart representative of example machine readable instructions which may be executed to determine an interactivity score of a user on a social networking site.

FIG. 14 is a flowchart representative of example machine readable instructions 1400 which may be executed to determine an interactivity score of a user on a social networking site (e.g., the social networking site 102 of FIG. 1). The example instructions may be used to implement the example interactivity monitor 206 of FIG. 2 to execute block 1112 of FIG. 11. Blocks 1402-1408 of FIG. 14 may iterate for each user of a number of users for which an interactivity score is to be generated.

The example interactivity monitor 206 may begin after block 1110 of the example instructions 1100 by identifying relational matrices having an initial interaction performed by the selected user (e.g., the user i 406 of FIG. 4) (block 1402). For example, the interactivity monitor 206 may identify those relational matrices previously generated, updated, and/or stored in the database 118 of FIG. 2 by the interactivity monitor 206 during the processing of interactions on the social networking site 102 of FIG. 1. The interactivity monitor 206 sums the interaction counts from the identified relational matrices to identify an interactivity for the selected user i 406 (block 1404). In some examples, the relational matrices are based on an initial interaction performed by the user i 406, and therefore the user i 406 either performs or receives the initial interaction(s) and/or any response interaction(s) included in the relational matrices, and the interaction counts may be attributed to the user i 406. In some other examples, however, the relational matrices may include interaction counts that are not associated with the user i 406. In this case the interactivity monitor 206 determines the interaction counts for the user i 406 by, for example, counting interaction counts in the rows and/or columns corresponding to the user i 406.

The example interactivity monitor 206 then determines the interactivity score based on the interactivity (block 1406). For example, the interactivity monitor 206 may determine the interactivity score as a percentile rank of interaction counts for the user i 406 compared to the number of interaction counts for other users (e.g., the users 408-412) and/or as a number of interaction counts. The interactivity monitor 206 stores the interactivity and the interactivity score for the selected user i 406 (block 1408). The example blocks 1402-1408 may then iterate to determine an interactivity score for another user or may return control to block 1114 of FIG. 11.

Figure 15:
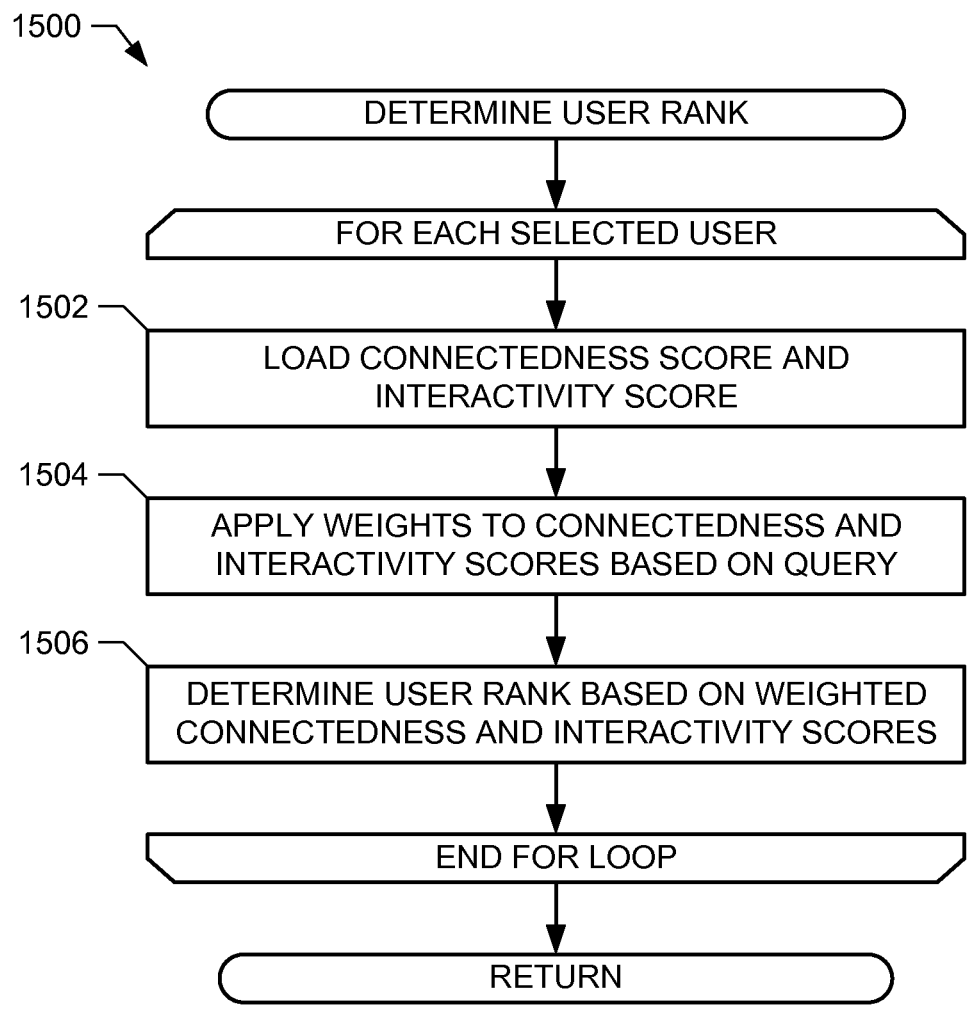
FIG. 15 is a flowchart representative of example machine readable instructions which may be executed to determine a rank of a user on a social networking site.

FIG. 15 is a flowchart representative of example machine readable instructions 1500 which may be executed to determine an overall (e.g., composite) rank of a user on a social networking site (e.g., the example social networking site 102 of FIG. 1). The example instructions 1500 may be used to implement the example user ranker 208 to execute block 1114 of FIG. 11. The example blocks 1502-1506 may be iterated for each user of a number of users to be ranked.

The example user ranker 208 loads a connectedness score and an interactivity score (block 1502). For example, the user ranker 208 receives the connectedness score from the connectedness monitor 204 (e.g., generated by executing blocks 1302-1310 of FIG. 13) and receives the interactivity score from the interactivity monitor 206 (e.g., generated by executing blocks 1402-1406 of FIG. 14). The user ranker 208 then applies weights to connectedness and interactivity scores based on the query (block 1504). For example, the user ranker 208 may apply equal weights to the connectedness and interactivity scores or may apply a higher weight to one of the connectedness score or the interactivity score and a lower weight to the other of the scores. For example, the connectedness score may have a higher weight than the interactivity score if the user request query 210 indicates that the connectedness score is more important to the requester than the interactivity score.

The example user ranker 208 then determines the user rank based on the connectedness and interactivity scores (block 1506). After determining the user rank, the user ranker 208 may iterate blocks 1502-1506 for additional users or may return control to block 1116 of FIG. 11.

Figure 16:
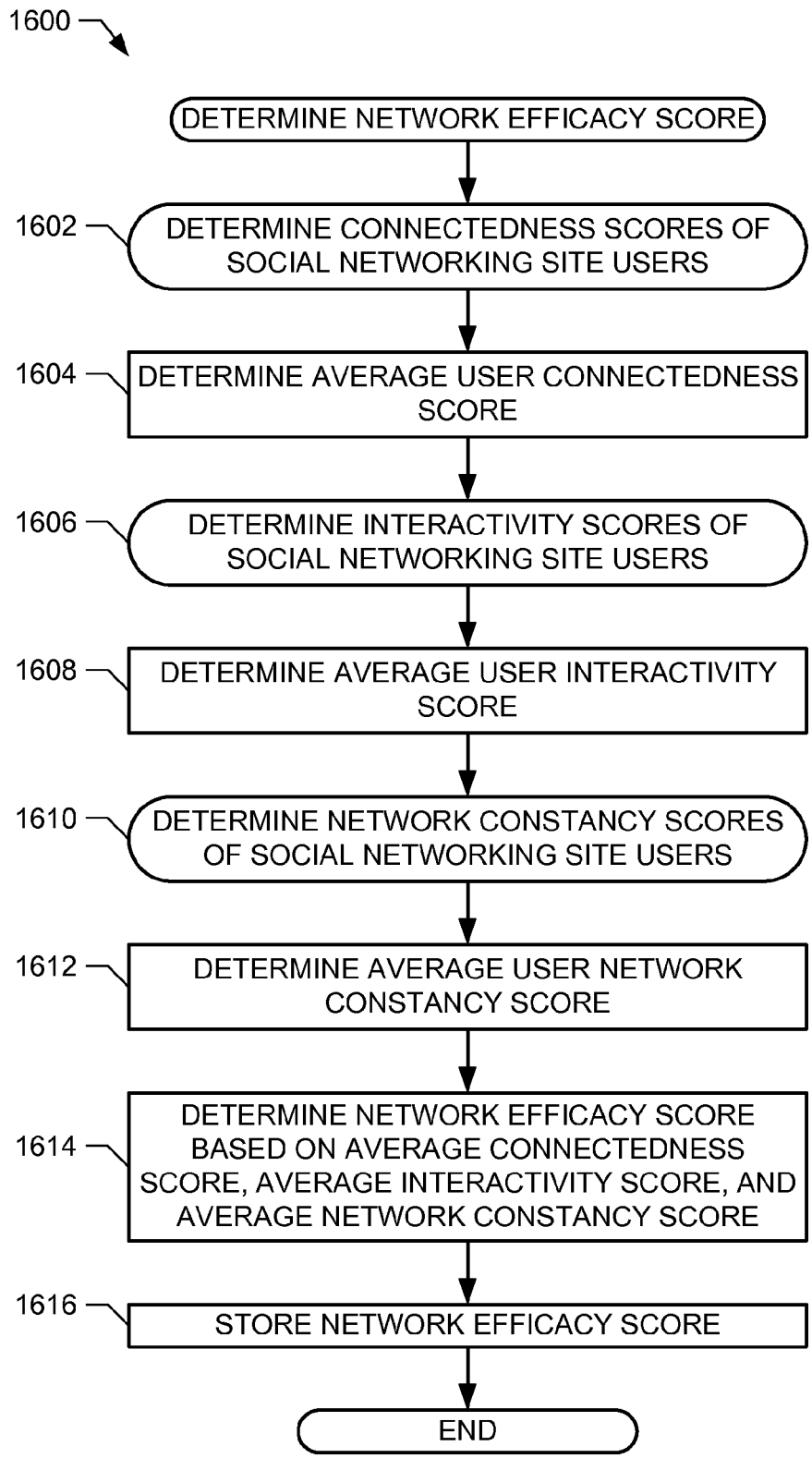
FIG. 16 is a flowchart representative of example machine readable instructions which may be executed to determine a network efficacy score.

FIG. 16 is a flowchart representative of example machine readable instructions 1600 which may be executed to determine a network efficacy score (e.g., for the social networking site 102 of FIG. 1). The example instructions 1600 may be executed by one or more of the example user selector 202, the example connectedness monitor 204, the example interactivity monitor 206, and/or the example network efficacy determiner 218 to generate the network efficacy score(s) 220 (FIG. 2) for the social networking site 102.

The example connectedness monitor 204 may begin by determining connectedness scores for users of the social networking site 102 (block 1602). Block 1602 may be implemented by the example connectedness monitor 204 of FIG. 2 by executing the example machine readable instructions 1300 of FIG. 13. The example connectedness monitor 204 and/or the network efficacy determiner 218 may determine an average user connectedness score for the users of the social networking site 102 (block 1604).

The example interactivity monitor 206 then determines interactivity scores for the users of the social networking site 102 (block 1606). Block 1606 may be implemented by the interactivity monitor 206 by executing the example machine readable instructions 1400 of FIG. 14. The example interactivity monitor 206 and/or the network efficacy determiner 218 may determine an average user interactivity score for the users of the social networking site 102 (block 1608).

The example connectedness monitor 204 further determines network constancy scores for the users of the social networking site 102 (block 1610). Block 1610 may be implemented by the example connectedness monitor 204 of FIG. 2 by executing the example machine readable instructions 1700 described with reference to FIG. 17 below. The example connectedness monitor 204 and/or the network efficacy determiner 218 may determine an average user network constancy score for the users of the social networking site 102 (block 1612). While the example blocks 1604, 1608, and 1612 determine the average connectedness, the average interactivity, and the average network constancy scores for the users, respectively, the example blocks 1604, 1608, and 1612 may additionally or alternatively determine a median score, a mode score, and/or any other score that is representative of the user scores on the social networking site 102.

The example network efficacy determiner 218 then determines a network efficacy score 220 based on the average connectedness score, the average interactivity score, and/or the average network constancy score (block 1614). For example, the network efficacy determiner 218 may subtract the network constancy score (where a higher network constancy score represents a higher network instability) from the sum of the interactivity score and the connectedness score. However, other formulations of the network efficacy determiner 218 may be used to determine a network efficacy score. After determining the network efficacy score 220, the example network efficacy determiner 218 stores the network efficacy score 220 for later retrieval and/or transmittal. In some examples, the network efficacy determiner 218 may transmit the network efficacy score 220 to a requester of the network efficacy score. The example instructions 1600 may then end.

Figure 17:
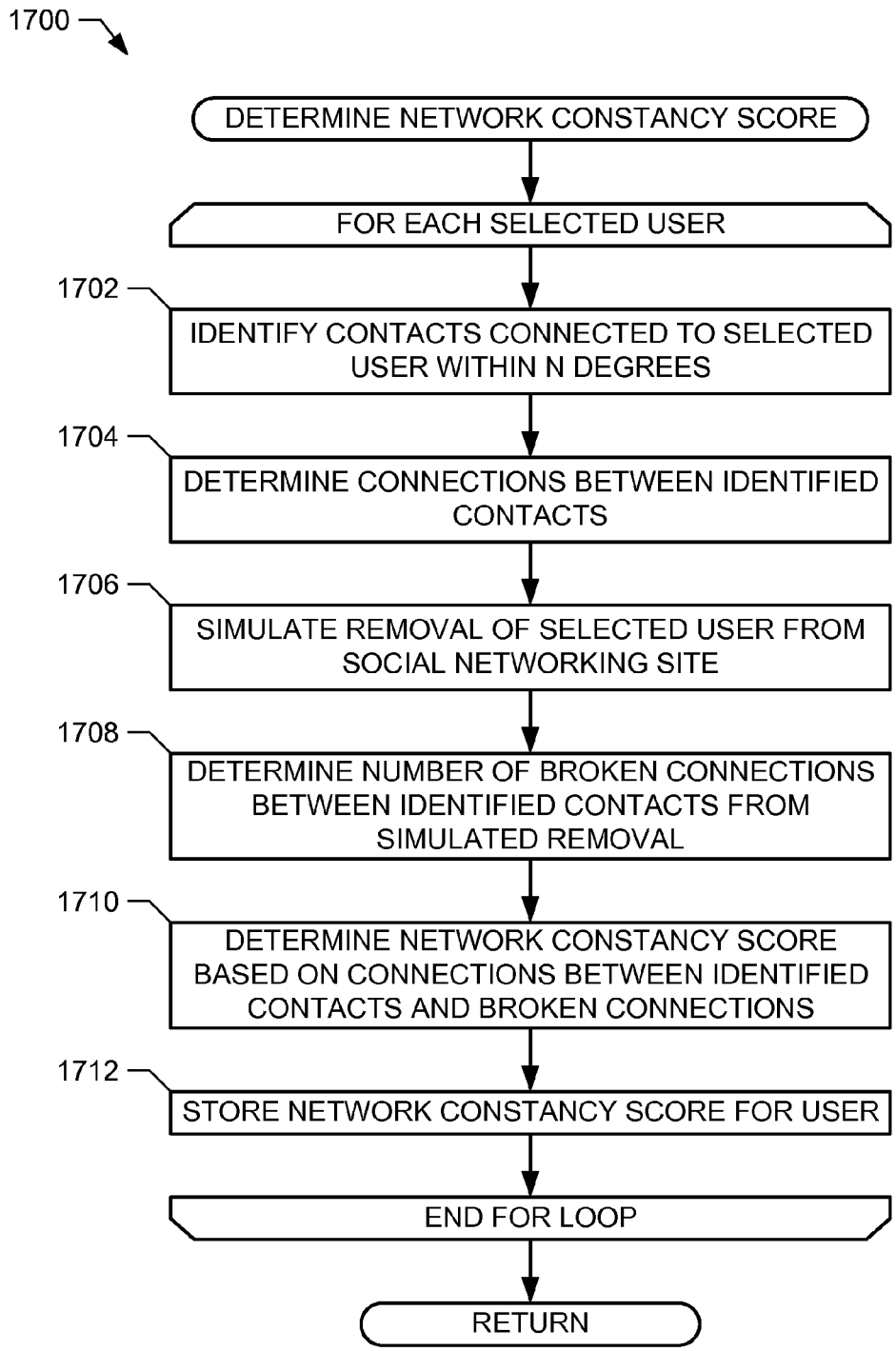
FIG. 17 is a flowchart representative of example machine readable instructions which may be executed to determine a network constancy score of a social networking site.

FIG. 17 is a flowchart representative of example machine readable instructions 1700 which may be executed to determine a network constancy score (e.g., the network constancy score 220 of FIG. 2) of a social networking site (e.g., the social networking site 102 of FIG. 1). The example instructions 1700 may be executed by the connectedness monitor 204 of FIG. 2 to implement block 1610 of FIG. 16. Blocks 1702-1712 of the example instructions 1700 may be iterated for multiple users of the social networking site 102.

The example connectedness monitor 204 may begin an iteration of a loop by selecting a user of the example social networking site 102 (e.g., the user 302 of FIG. 3). For the selected user 302, the connectedness monitor 204 identifies the contacts (e.g., the users 304-308) who are connected to the selected user 302 within a number N of degrees of connection (e.g., up to a third-degree connection) (block 1702). The connectedness monitor 204 then determines the connections between the identified contacts (block 1704). For example, the connectedness monitor 204 may determine that there is a second-degree connection between the user 304*a* and each of the users 304*b*-304*d*, etc.

The connectedness monitor 204 simulates a removal of the user 302 from the social networking site 102 (block 1706). For example, the connectedness monitor 204 may view the user 304*a* as disconnected from the users 304*b*-304*d*. Based on the simulated removal, the connectedness monitor 204 determines a number of broken connections that result (block 1708). The network constancy score for the user 302 may be determined based on the connections between the identified users 304-308 and the broken connections resulting from the removal of the user 302 (block 1710). For example, the connectedness monitor 204 may determine the network constancy score as the ratio of broken connections to the number of connections between the identified users (e.g., when the user 302 is still considered as in the social networking site 102). However, other formulations of the network constancy score may be determined.

The example connectedness monitor 204 then stores the network constancy score for the user 302 (e.g., in the database 118 of FIG. 2) (block 1712). After storing the network constancy score, the connectedness monitor 204 may iterate by selecting another user of the social networking site 102 and looping control to block 1702 or the example instructions 1700 may end and return control to block 1612 of FIG. 16.

Figure 18:
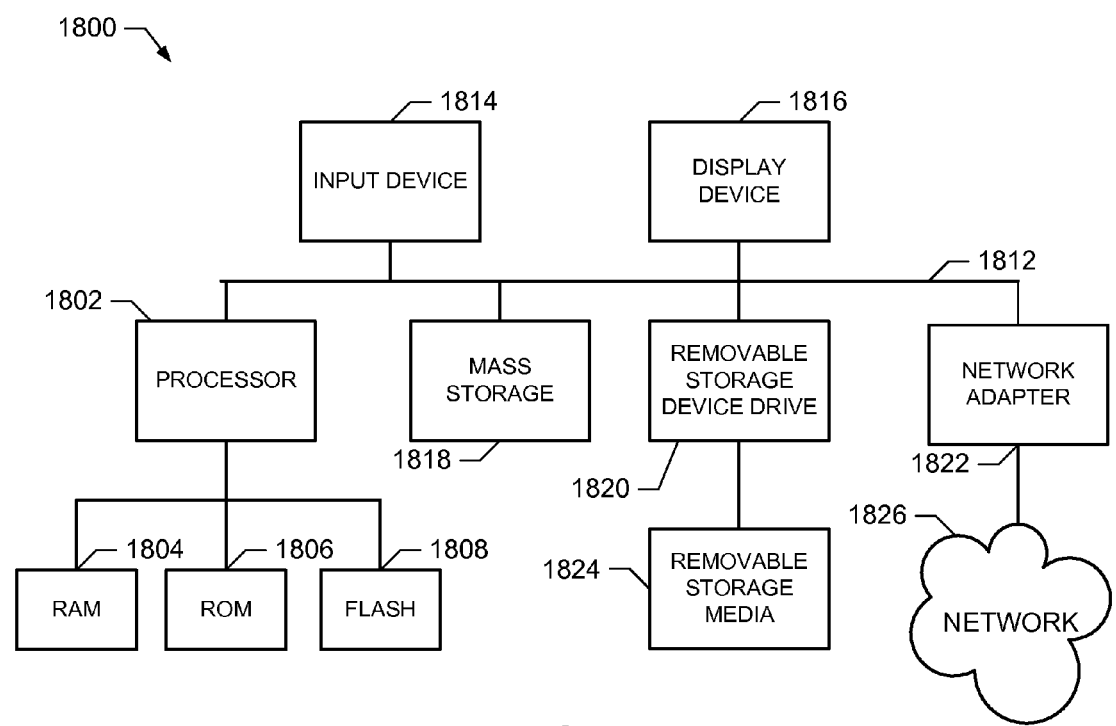
FIG. 18 is a diagram of an example processor system that may be used to execute the example machine readable instructions of FIGS. 11-17 to implement the social networking monitor of FIG. 2.

FIG. 18 is a diagram of an example processor system 1800 that may be used to execute the example machine readable instructions 1100, 1200, 1300, 1400, 1500, 1600, and 1700 described in FIGS. 11-17, as well as to implement the social network monitor 112 described in FIG. 2. The example processor system 1800 includes a processor 1802 having associated memories, such as a random access memory (RAM) 1804, a read only memory (ROM) 1806 and a flash memory 1808. The processor 1802 is coupled to an interface, such as a bus 1812 to which other components may be interfaced. In the illustrated example, the components interfaced to the bus 1812 include an input device 1814, a display device 1816, a mass storage device 1818, a removable storage device drive 1820, and a network adapter 1822. The removable storage device drive 1820 may include associated removable storage media 1824 such as magnetic or optical media. The network adapter 1822 may connect the processor system 1800 to an external network 1826.

The example processor system 1800 may be, for example, a conventional desktop personal computer, a notebook computer, a workstation or any other computing device. The processor 1802 may be any type of processing unit, such as a microprocessor from the Intel® Pentium® family of microprocessors, the Intel® Itanium® family of microprocessors, and/or the Intel XScale® family of processors. The memories 1804, 1806 and 1808 that are coupled to the processor 1802 may be any suitable memory devices and may be sized to fit the storage demands of the system 1800. In particular, the flash memory 1808 may be a non-volatile memory that is accessed and erased on a block-by-block basis.

The input device 1814 may be implemented using a keyboard, a mouse, a touch screen, a track pad, a barcode scanner or any other device that enables a user to provide information to the processor 1802.

The display device 1816 may be, for example, a liquid crystal display (LCD) monitor, a cathode ray tube (CRT) monitor or any other suitable device that acts as an interface between the processor 1802 and a user. The display device 1816 as pictured in FIG. 18 includes any additional hardware required to interface a display screen to the processor 1802.

The mass storage device 1818 may be, for example, a conventional hard drive or any other magnetic, optical, or solid state media that is readable by the processor 1802.

The removable storage device drive 1820 may, for example, be an optical drive, such as a compact disk-recordable (CD-R) drive, a compact disk-rewritable (CD-RW) drive, a digital versatile disk (DVD) drive or any other optical drive. It may alternatively be, for example, a magnetic media drive and/or a solid state universal serial bus (USB) storage drive. The removable storage media 1824 is complimentary to the removable storage device drive 1820, inasmuch as the media 1824 is selected to operate with the drive 1820. For example, if the removable storage device drive 1820 is an optical drive, the removable storage media 1824 may be a CD-R disk, a CD-RW disk, a DVD disk or any other suitable optical disk. On the other hand, if the removable storage device drive 1820 is a magnetic media device, the removable storage media 1824 may be, for example, a diskette or any other suitable magnetic storage media.

The network adapter 1822 may be, for example, an Ethernet adapter, a wireless local area network (LAN) adapter, a telephony modem, or any other device that allows the processor system 1800 to communicate with other processor systems over a network. The external network 1826 may be a LAN, a wide area network (WAN), a wireless network, or any type of network capable of communicating with the processor system 1800. Example networks may include the Internet, an intranet, and/or an ad hoc network.

It is noted that this patent claims priority from Indian Patent Application Serial Number 1486/Che/2010, which was filed on May 31, 2010, and is hereby incorporated by reference in its entirety.

While the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to determine a first network efficacy of a first social networking site to facilitate delivery of an advertisement to a user of the first social networking site, the method comprising:
    accessing, by executing an instruction with a processor, interaction data and contact data for the user of the first social networking site via an interface provided by the first social networking site;
    determining, by executing an instruction with the processor, a connectedness for the user based on the contact data;
    determining, by executing an instruction with the processor, an interactivity for the user based on the interaction data;
    determining, by executing an instruction with the processor, a network constancy for the user by determining a ratio of (a) connections between contacts of the user of the first social networking site to (b) at least one of:
        (1) broken connections between the contacts of the user in response to removal of the user from the first social networking site; or
        (2) connections between the contacts of the user that exhibit changed degrees of connection in response to removal of the user from the first social networking site;
    determining, by executing an instruction with the processor, the first network efficacy of the first social networking site based on the connectedness, the interactivity, and the network constancy, the network constancy being based on the ratio; and
    transmitting the first network efficacy from the processor to an advertising server to facilitate delivery of the advertisement from the advertising server to the user of the first social networking site.

2. The method as defined in claim 1, wherein the determining of the network constancy includes determining a number of connections between users in the first social networking site that are based on the presence of the user in the first social networking site.

3. The method as defined in claim 1, wherein the determining of the connectedness is based on a number of first-degree contacts of the user and a number of second-degree contacts of the user, and the determining of the connectedness includes assigning a first weight to a first one of the first-degree contacts who has restricted a connection with the user, and assigning a second weight to a second one of the first-degree contacts who has not restricted a connection with the user.

4. The method as defined in claim 1, wherein the determining of the interactivity of the user includes:
    determining a number of first interactions directed from the user to a first one of the contacts by generating at least one of a matrix or a vector representative of an interaction between the user and the first one of the contacts; and
    determining a number of second interactions associated with the first interaction and the first one of the contacts by generating or updating the at least one of the matrix or the vector representative of an interaction between the user and the first one of the contacts.

5. The method as defined in claim 1, further including comparing the first network efficacy of the first social networking site to a second network efficacy of a second social networking site used by the user, and selecting the first social networking site for delivery of advertisements to the user based on the comparison.

6. An apparatus to determine a first network efficacy of a first social networking site to facilitate delivery of an advertisement to a user of the first social networking site, the apparatus comprising:
    a user selector to access interaction data and contact data for the user of the first social networking site via an interface provided by the first social networking site;
    an interactivity monitor to determine an interactivity for the user based on the interaction data;
    a connectedness monitor to determine a connectedness for the user based on the contact data and to determine a network constancy for the user by determining a ratio of (a) connections between contacts of the user of the first social networking site to (b) at least one of:
(1) broken connections between the contacts of the user in response to removal of the user from the first social networking site; or
(2) connections between the contacts of the user that exhibit changed degrees of connection in response to removal of the user from the first social networking site; and a network efficacy determiner to determine the first network efficacy of the first social networking site based on the connectedness, the interactivity, and the network constancy, the network constancy being based on the ratio, the network efficacy determiner to transmit the first network efficacy to an advertising server to facilitate delivery of the advertisement from the advertising server to the user of the first social networking site.

7. The apparatus as defined in claim 6, wherein the connectedness monitor is to determine the network constancy by determining a number of connections between users in the first social networking site that are based on the presence of the user in the first social networking site.

8. The apparatus as defined in claim 6, wherein the connectedness monitor is to determine the connectedness based on a number of first-degree contacts of the user and based on a number of second-degree contacts of the user, and the connectedness monitor is to determine the connectedness by assigning a first weight to a first one of the first-degree contacts who has restricted a connection with the user and assigning a second weight to a second one of the first-degree contacts who has not restricted a connection with the user.

9. The apparatus as defined in claim 6, wherein the interactivity monitor is to determine the interactivity of the user by:
determining a number of first interactions directed from the user to a first one of the contacts by generating at least one of a matrix or a vector representative of an interaction between the user and the first one of the contacts; and
determining a number of second interactions associated with the first interaction and the first one of the contacts by generating or updating the at least one of the matrix or the vector representative of an interaction between the user and the first one of the contacts.

10. The apparatus as defined in claim 6, wherein the network efficacy determiner is to store the first network efficacy of the first social networking site for subsequent selection of the first social networking site or a second social networking site used by the user for delivery of advertisements to the user based on a comparison of the first network efficacy to a second network efficacy of the second social networking site.

11. A tangible computer readable storage medium, comprising computer readable instructions which, when executed, cause a processor to at least:
access interaction data and contact data for a user of a first social networking site via an interface provided by the first social networking site;
determine a connectedness for the user based on the contact data;
determine an interactivity for the user based on the interaction data;
determine a network constancy for the user by determining a ratio of (a) connections between contacts of the user of the first social networking site to (b) at least one of:
(1) broken connections between the contacts of the user in response to removal of the user from the first social networking site; or
(2) connections between the contacts of the user that exhibit changed degrees of connection in response to removal of the user from the first social networking site;
determine a first network efficacy of the first social networking site based on the connectedness, the interactivity, and the network constancy, the network constancy being based on the ratio; and
transmit the first network efficacy to an advertising server to facilitate delivery of an advertisement to the user of the first social networking site.

12. The storage medium as defined in claim 11, wherein the instructions are to cause the processor to determine the network constancy by determining a number of connections between users in the social networking site that are based on the presence of the user in the first social networking site.

13. The storage medium as defined in claim 11, wherein the instructions are to cause the processor to determine the connectedness based on a number of first-degree contacts of the user and a number of second-degree contacts of the user, and the instructions are to cause the processor to determine the connectedness by assigning a first weight to a first one of the first-degree contacts who has restricted a connection with the user and assigning a second weight to a second one of the first-degree contacts who has not restricted a connection with the user.

14. The storage medium as defined in claim 11, wherein the instructions are to cause the processor to determine the interactivity of the user by:
determining a number of first interactions directed from the user to a first one of the contacts by generating at least one of a matrix or a vector representative of an interaction between the user and the first one of the contacts; and
determining a number of second interactions associated with the first interaction and the first one of the contacts by generating or updating the at least one of the matrix or the vector representative of an interaction between the user and the first one of the contacts.

15. The storage medium as defined in claim 11, wherein the instructions are further to cause the processor to compare the first network efficacy of the first social networking site to a second network efficacy of a second social networking site used by the user, and select the first social networking site for delivery of advertisements to the user based on the comparison.

* * * * *